(12) United States Patent
Nagumo

(10) Patent No.: US 8,581,946 B2
(45) Date of Patent: Nov. 12, 2013

(54) DRIVING DEVICE, OPTICAL PRINT HEAD AND IMAGE FORMING DEVICE

(75) Inventor: Akira Nagumo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 180 days.

(21) Appl. No.: 13/070,840

(22) Filed: Mar. 24, 2011

(65) Prior Publication Data

US 2011/0234734 A1  Sep. 29, 2011

(30) Foreign Application Priority Data

Mar. 24, 2010 (JP) ................................. 2010-067336

(51) Int. Cl.
  *B41J 2/385* (2006.01)
  *G03G 13/04* (2006.01)
  *B41J 2/435* (2006.01)

(52) U.S. Cl.
  USPC ............................ 347/132; 347/237; 347/247

(58) Field of Classification Search
  USPC .......................................... 347/132, 237, 247
  See application file for complete search history.

(56) References Cited

U.S. PATENT DOCUMENTS

| 6,064,158 | A  | * | 5/2000  | Kishita et al. | ............... 315/169.3 |
| 6,327,125 | B1 | * | 12/2001 | Colclaser et al. | ............... 361/56 |
| 7,042,591 | B1 | * | 5/2006  | Yamazaki et al. | ............. 358/1.5 |
| 7,193,250 | B2 | * | 3/2007  | Ohno | ............................ 257/115 |

FOREIGN PATENT DOCUMENTS

JP   2002141554 A  * 5/2002  ............. H01L 33/00
JP   A-2004-195796    7/2004

\* cited by examiner

*Primary Examiner* — Laura Martin
*Assistant Examiner* — Jeremy Bishop
(74) *Attorney, Agent, or Firm* — Muncy, Geissler, Olds & Lowe, PLLC

(57) ABSTRACT

When the cathode of a light emitting thyristor is at the low (L) level, voltage is applied between the anode and cathode of the light emitting thyristor. In addition, because the gate of each thyristor and the gate of each light emitting thyristor are connected to each other in a self scanning circuit 100, voltage is also applied between the gate and cathode of the thyristor. At this time, by selectively turning only the gate of the light emitting thyristor, which is instructed by the self scanning circuit to emit light, to the high (H) level, the light emitting thyristor that is instructed is turned on. In particular, because an output signal of a clock driving circuit is differentiated by an RL differential circuit to generate an undershoot or overshoot waveform, the number of output terminals of the clock driving circuit can be reduced.

21 Claims, 16 Drawing Sheets

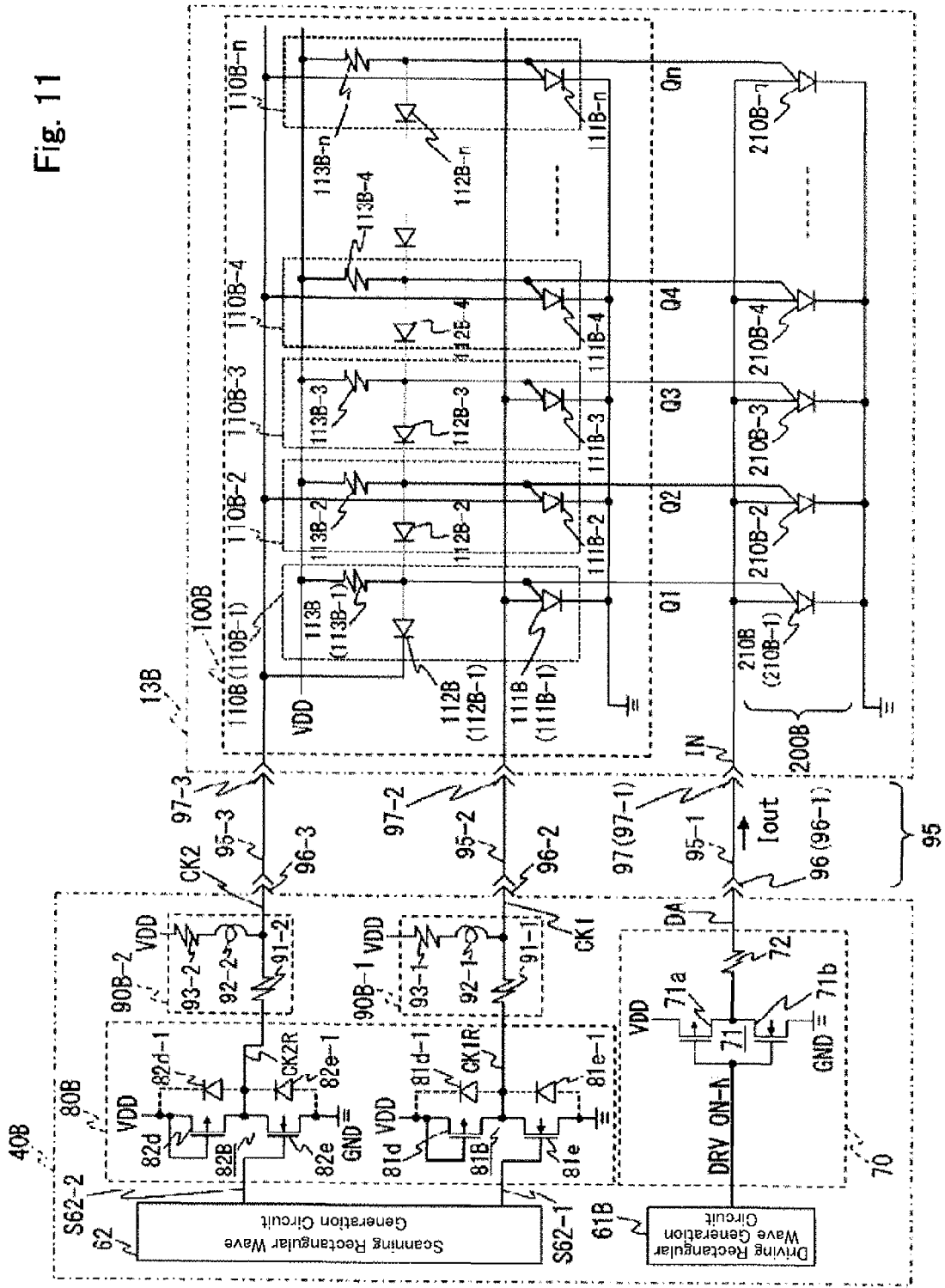

DRIVING DEVICE, OPTICAL PRINT HEAD AND IMAGE FORMING DEVICE

CROSS REFERENCE TO RELATED APPLICATION

The present application is related to, claims priority from and incorporates by reference Japanese Patent Application No. 2010-067336, filed on Mar. 24, 2010.

TECHNICAL FIELD

The present embodiments relate to a driving device that drives a plurality of light emitting elements, an optical print head that includes the driving device, and an image forming device.

BACKGROUND

There are image forming devices, such as electrographic printers, in which an exposure part is configured from a plurality of light emitting thyristors arrayed as light emitting elements. In such image forming devices using the light emitting thyristors, a driving circuit and the light emitting thyristors are provided at a ratio of 1:N (N>1). Positions of the light emitting thyristors to be driven are designated by using the gates of the light emitting thyristors. Light emission power is controlled by a value of current that flows between the anode and cathode of the respective light emitting thyristors.

So-called self scanning optical print heads are known as optical print heads that use the light emitting thyristors. When driving a conventional self scanning optical print head under a power source voltage of 3.3 V, gate trigger current cannot be generated with the 3.3 V for the power source voltage. To compensate for this, a configuration is known in which an undershoot voltage is generated in a transfer clock signal waveform (hereinafter "clock signal" is simply referred to as "clock"), and in which the gate trigger current is generated with an added value of the undershoot voltage and 3.3 V for the power source voltage.

For example, according to the technique disclosed in Japanese Laid-Open Patent Application Publication No. 2004-195796, in order to generate the transfer clock waveform, a first output terminal and a second output terminal are provided in a clock driving circuit. A signal from the first output terminal is transmitted to a capacitor-resistor (CR) differential circuit to generate an undershoot waveform, and a direct current component is transmitted through the second output terminal. The reason for the two output terminals per transfer clock in the clock driving circuit is that the direct current component cannot be transmitted through the CR differential circuit.

However, in the conventional self scanning optical print head, there are the following concerns with two output terminals per transfer clock in the clock driving circuit.

In the optical print head, a large number of self scanning light emitting thyristor array chips is provided, and the operation of the self scanning light emitting thyristor array chips is simultaneously performed in parallel for high speed operation. A 2-phase clock is used as a data transfer clock for the light emitting thyristor array chips, and two clocks are inputted to each light emitting thyristor array chip. Therefore, four output terminals are required in a clock driving circuit for the self scanning optical print head for driving each light emitting thyristor array chip.

Because a large number of self scanning light emitting thyristor array chips are arranged in an optical print head, the total number of output terminals provided in a clock driving circuit becomes enormous. If the number of terminals are controlled so that the terminals can be accommodated in a large-scale integration (hereinafter "LSI") package, a large number of chips that are connected in parallel to and that are driven by a clock driving circuit is required, causing waveform rounding. As a result, there is a problem that the operation of the optical print head cannot be performed at high speed.

A similar problem occurs in a self scanning optical print head that uses a light emitting diode (hereinafter "LED") as the light emitting element.

Therefore, circuitry is desired that generates clocks for self scanning light emitting element array chips without increasing in the number of terminals that can be accommodated in an LST package that drives the optical print heads.

SUMMARY

A driving device disclosed in the application driving a plurality of light emitting elements that are connected in parallel to a common terminal includes a scanning circuit, a data driving circuit, a clock driving circuit, and a differential circuit.

Wherein, in the scanning circuit, a plurality of 3-terminal switching elements are arranged, the plurality of 3-terminal switching elements each including a first terminal connected to a first power source, a second terminal connected to a clock terminal, and a control terminal that controls an ON/OFF state between the first and second terminals, a signal flowing to each of the control terminal to the light emitting elements is output by ON/OFF switching of the 3-terminal switching elements based on a first clock signal supplied from the clock terminal, and the scanning circuit sequentially scans and drives the plurality of light emitting elements. The data driving circuit drives a driving rectangular wave signal and supplies a data signal (hereinafter, as data) to the common terminal. The clock driving circuit drives a scanning rectangular wave signal and that outputs a second clock signal. The a differential circuit generates the first clock signal in which a differential waveform is formed at an edge of the second clock signal by differentiating the second clock signal using an inductor, and supplies the first clock signal to the clock terminal.

An optical print head disclosed in the application includes the plurality of light emitting elements and the driving device described above.

An image forming device disclosed in the application includes the optical print head described above, and forms an image on a recording medium by exposing a photosensitive drum using the optical print head.

According to the driving device of the first aspect of the present embodiments and the optical print head of the second aspect of the present embodiments, the second clock outputted from the clock driving circuit is differentiated by differential circuits with an inductor, and the first clock, in which a differential waveform is formed at an edge of the second clock, is generated and supplied to a scanning circuit. Therefore, a single output terminal for the second clock output is provided for each clock in the clock driving circuit. Thus, the number of the required terminals is reduced by half compared to the conventional configuration. As a result, the data transfer speed in the optical print head is improved. In addition, because of the reduced number of output terminals in the clock driving circuit, the reduction of circuit size and lower cost are realized.

According to the image forming device of the third aspect of the present embodiments, with the optical print heads of the second aspect of the present embodiments, there is provided a high quality image forming device that is superior in space efficiency and light extraction efficiency.

BRIEF DESCRIPTION OF THE DRAWINGS

FIG. 11 is a block diagram that illustrates circuitry of the print controller and the optical print head according to a second embodiment.

DETAILED DESCRIPTION OF THE EMBODIMENTS

Embodiments of the present application become apparent when the description of the embodiments herein is read with reference to the attached drawings. However, the drawings are for explanatory purposes only and are not intended to limit the scope of the present embodiments.

Figure 2:
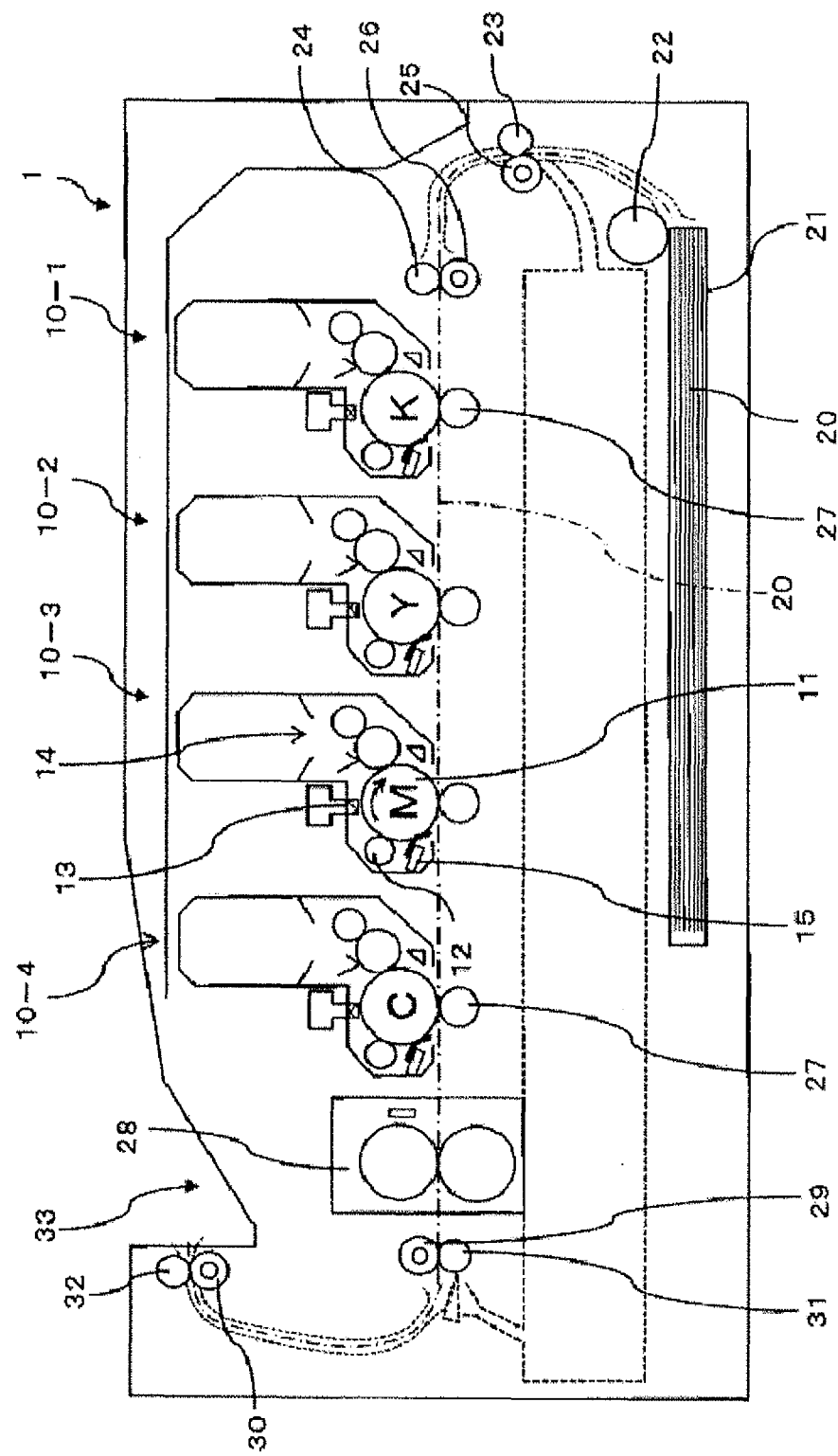
FIG. 2 illustrates a schematic configuration of an image forming device according to the first embodiment.

First Embodiment (Image Forming Device of First Embodiment) FIG. 2 illustrates a schematic configuration of an image forming device according to the first embodiment.

The image forming device 1 is configured from a tandem electrographic color printer, in which an exposure device (e.g., optical print head) including a light emitting element array that uses driven elements (e.g., light emitting thyristors, which are 3-terminal light emitting elements, as the light emitting element) is installed. The image forming device 1 includes four process units 10-1 to 10-4, which form images in black (K), yellow (Y), magenta (M) and cyan (C), respectively. The process units 10-1 to 10-4 are sequentially arranged from the upstream side of a carrying path of a recording medium (e.g., paper) 20. Because the internal configuration of each of the process units 10-1 to 10-4 is the same, the internal configuration of the magenta process unit 10-3, for example, is explained as an example.

In the process unit 10-3, a photosensitive body (e.g., photosensitive drum) 11, which functions as an image carrier, is arranged rotatably in the direction of an arrow shown in FIG. 2. Around the photosensitive drum 11, a charge device 12 that supplies electric charge to, and charges, the surface of the photosensitive drum 11, and an optical front head 13, which functions as an exposure device, that forms an electrostatic latent image on the photosensitive drum 11 by irradiating light selectively onto the charged surface of the photosensitive drum 11, are provided in order from the upstream side of the rotational direction. In addition, a developing device 14 and a cleaning device 15 are arranged. The developing device 14 develops an image by attaching magenta (predetermined color) toner on the surface of the photosensitive drum 11, on which the electrostatic latent image has been formed. The cleaning device 15 removes residue toner after transferring the toner image on the photosensitive drum 11. The drum and rollers used in each of these devices are rotated by the motive power transmitted from a drive source (not shown) via gears and the like.

A sheet cassette 21 with sheets 20 stored therein is installed in the lower part of the image forming device 1. A hopping roller 22 for separating and carrying the sheets 20 piece by piece is provided above the sheet cassette 21. On the downstream side of the hopping roller 22 in a carrying direction of the sheet 20, pinch rollers 23 and 24, a carrying roller 25 and a registration roller 26 are provided. The carrying roller 25 carries the sheet 20 by pinching the sheet 20 with the pinch roller 23. The registration roller 26 corrects oblique passage of the sheet 20 and carries the sheet to the process unit 10-1 by pinching the sheet 20 with the pinch roller 24. The hopping roller 22, the carrying roller 25 and the registration roller 26 are rotated by the motive power transmitted from a drive source (not shown) via gears and the like.

At a position opposing the photosensitive drum 11 in each of the process units 10-1 to 10-4, a transfer roller 27 is provided that is formed from a semi-conductive rubber or the like. Electric charge is applied to each transfer roller 27 when transferring the toner image attached to the photosensitive drum 11 onto the sheet 20, so that a potential difference is provided between surface potential of the photosensitive drum 11 and surface potential of the transfer roller 27.

A fuser 28 is provided on the downstream of the process unit 10-4. The fuser 28 includes a heating roller and a backup roller. The fuser 28 is a device to fix the toner transferred onto the sheet 20 by pressure and heating. On the downstream side of the fuser 28, there are ejection rollers 29 and 30, ejection part pinch rollers 31 and 32, and a sheet stacker 33. The ejection rollers 29 and 30 pinch the sheet 20 ejected from the fuser 28, with the ejection part pinch rollers 31 and 32, respectively, and carry the sheet 20 to the sheet stacker 33. The fuser 28, the ejection roller 29 and the like are rotated by the motive power transmitted from the drive source (not shown) via gears and the like.

The image forming device 1 with the above-described configuration operates as follows. First, the sheets 20 stacked and stored in the sheet cassette 21 are carried piece by piece by the hopping roller 22. Then, each sheet 20 is pinched by the carrying roller 25, the registration roller 26 and the pinch rollers 23 and 24 and is carried between the photosensitive drum 11 and the transfer roller 27 of the process unit 10-1. The sheet 20 is sandwiched by the photosensitive drum 11 and the transfer roller 27 and is carried by the rotation of the photosensitive drum 11 while the toner image is transferred onto the recording surface of the sheet 20. The sheet 20 sequentially passes through the process units 10-2 to 10-4 in the similar manner. During this process, the toner image in each color, which is the image of the electrostatic latent image formed by the respective optical print head 13 and developed by the respective developing device 14, is sequentially transferred and superimposed on the recording surface of the sheet 20.

After the toner image in each color is superimposed on the recording surface of the sheet 20, the toner image is fixed on the sheet 20 by the fuser 28. Then, the sheet 20 is pinched by the ejection rollers 29 and 30 and the pinch rollers 31 and 32, respectively, and is ejected to the sheet stacker 33 outside the image forming device 1. A color image is formed on the sheet 20 through these processes.

Figure 3:
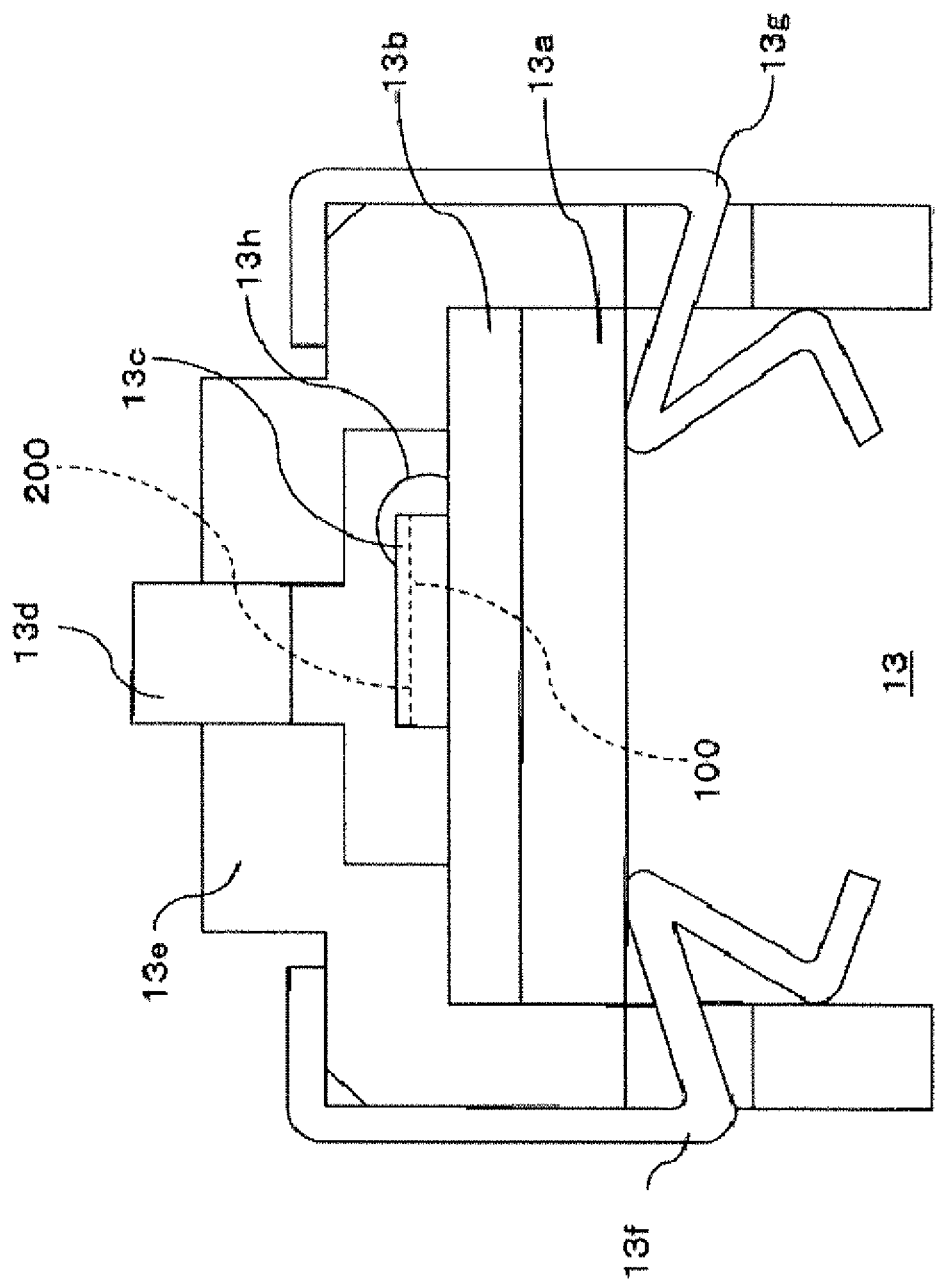
FIG. 3 is a schematic cross-sectional view that illustrates a configuration of an optical print head shown in FIG. 2.
Figure 4:
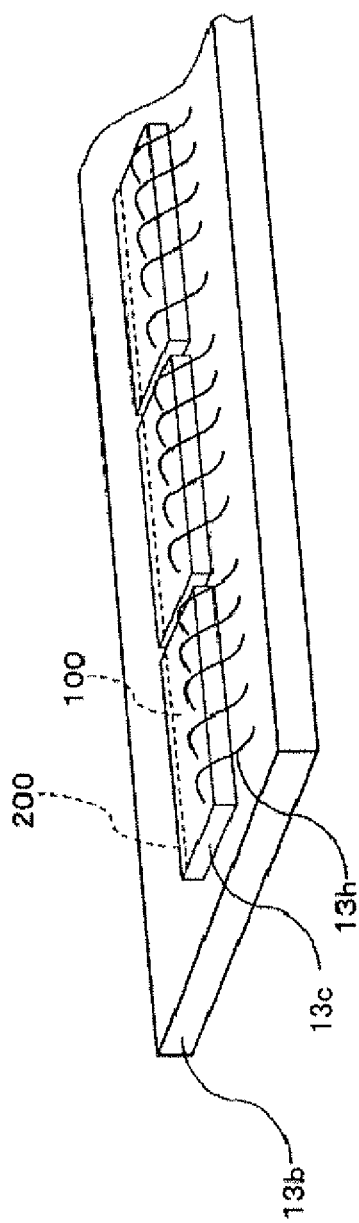
FIG. 4 is a perspective view that illustrates a substrate unit shown in FIG. 3.

(Optical Print Head in First Embodiment) FIG. 3 is a schematic cross-sectional view that illustrates a configuration of the optical print head 13 shown in FIG. 2. FIG. 4 is a perspective view that illustrates the substrate unit shown in FIG. 3.

The optical print head 13 shown in FIG. 3 includes a base member 13a. The substrate unit shown in FIG. 4 is fixed on the base member 13a. The base unit is configured from a printed wiring board 13b that is fixed on the base member 13a and a plurality of integrated circuit (IC) chips 13c that is fixed by adhesive or the like on the printed wiring board 13b. Scanning circuits (e.g., self scanning circuits) 100 are integrated on each IC chip 13c. A light emitting element array 200 configured from a light element array (e.g., light emitting thyristor array) is arranged on each self scanning circuit 100 as the main light emitting part. A plurality of terminals (not shown) on each IC chip 13c is electrically connected to a wiring pad (not shown) on the printed wiring board 13b by bonding wires 13h.

A lens array (e.g., rod lens array) 13d, in which a large number of pillar-shaped optical elements is arrayed, is positioned above the light emitting element array 200 on the plurality of IC chips 13c. The rod lens array 13d is fixed by a holder 13e. The base member 13a, the printed wiring board 13b and the holder 13e are fixed by clamp members 13f and 13g.

Figure 5:
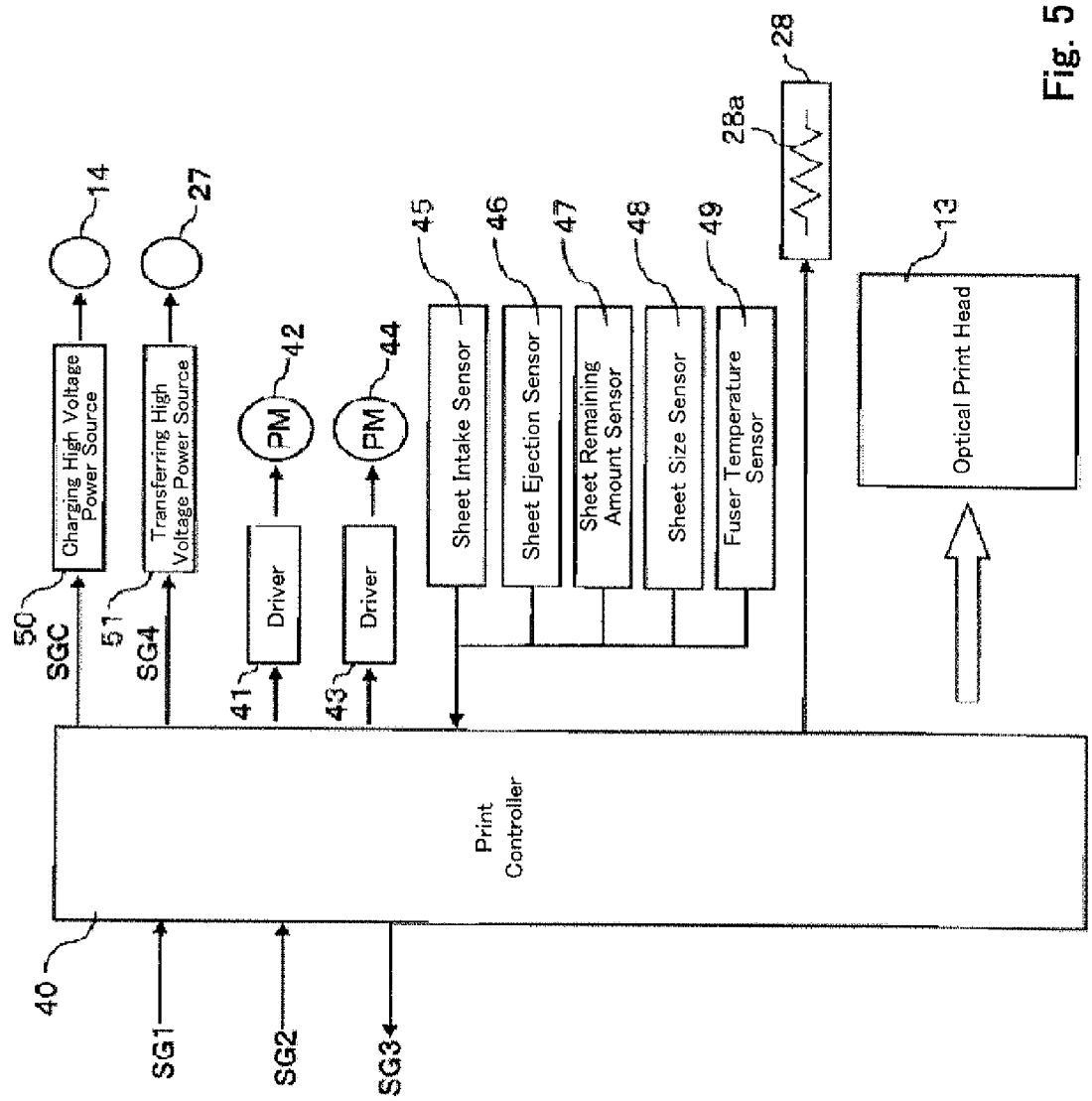
FIG. 5 is a block diagram that illustrates a configuration of a printer control circuit in an image forming device shown in FIG. 2.

(Printer Control Circuit in First Embodiment) FIG. 5 is a block diagram that illustrates a configuration of a printer control circuit in the image forming device 1 shown in FIG. 2.

The printer control circuit includes a print controller 40 provided inside a printing part in the image forming device 1. The print controller 40 is configured from a micro processor, a read-only memory (ROM), a random access memory (RAM), an input/output port for input and output of signals, a timer and the like. The print controller 40 has a function to perform print operations by sequence control of the entire printer using a control signal SG1 from a host controller (not shown), a video signal (one-dimensionally arrayed dot map data) SG2 and the like. The four optical print heads 13 for the process units 10-1 to 10-4, a heater 28a for the fuser 28, drivers 41 and 43, a sheet intake sensor 45, a sheet ejection sensor 46, a remaining sheet amount sensor 47, a sheet size sensor 48, a fuser temperature sensor 49, a charging high voltage power source 50, a transferring high voltage power source 51 and the like are connected to the print controller 40. A developing/transferring process motor (permanent magnet or PM) 42 is connected to the driver 41. A sheet feeding motor (PM) 44 is connected to the driver 43. The developing device 14 is connected to the charging high voltage power source 50. The transfer roller 27 is connected to the transferring high voltage power source 51.

The following operation is performed on the printer control circuit with such a configuration. When the print controller 40 receives a print instruction by the control signal SG1 from the host controller, the print controller 40 first determines by the temperature sensor 49 whether or not the heater 28a in the fuser 28 is in a usable temperature range. When the heater 28a is not in the temperature range, electricity is passed through the heater 28a to heat the heater 28a up to the usable temperature. Next, the developing/transferring process motor 42 is initiated. At the same time, the charging high voltage power source 50 is turned to the ON state by a charge signal SGC to charge the developing device 14.

Then, the presence and type of the sheet 20 in the sheet cassette 21 shown in FIG. 2 are detected by the remaining sheet amount sensor 47 and the sheet size sensor 48, and the sheet feeding that is appropriate for the detected sheet 20 is commenced. The sheet feeding motor 44 is rotatable bidirectionally by the driver 43. The sheet feeding motor 44 is first rotated in the reverse direction to feed the set sheet 20 by the predetermined amount until the sheet intake sensor 45 detects the sheet 20. Then, the sheet feeding motor 44 is rotated in the forward direction to early the sheet 20 into the print mechanism inside the printer.

When the sheet 20 reaches a printable position, the print controller 40 sends a timing signal SG3 (including a main-scanning synchronization signal and a sub-scanning synchronization signal) to the image processor (not shown) and receives the video signal SG2. The video signal SG2, which has been edited for each page by the image processor and received by the print controller 40, is transmitted to each print head 13 as print data. Each print head 13 includes a self scanning circuit 100 and a light emitting element array 200 for single dot (pixel) printing.

Transmission and reception of the video signal SG2 is performed for each printed line. The information to be printed by each optical print head 13 becomes a latent image with dots having increased potential on the respective photosensitive drum 11 (not shown) that has been charged by negative potential. The toner for image formation that has been charged by the negative potential adheres to each dot by electric attraction at the developing device 14 to form a toner image.

Thereafter, the toner image is forwarded to the transfer roller 27. In addition, the transferring high voltage power source 51 is turned to the ON state with positive potential by the transfer signal SG4. Therefore, the transfer roller 27 transfers the toner image on the sheet 20 that passes between the photosensitive drum 11 and the transfer roller 27. The sheet 20 with the transferred toner image is carried in contact with the fuser 28 that includes the heater 28a. The toner image is fixed onto the sheet 20 by the heat of the fuser 28. The sheet 20 with the fixed image is further carried from the print mechanism of the printer and through the sheet ejection sensor 46, and is ejected outside the printer.

The print controller 40 applies the voltage from the transferring high voltage power source 51 to the transfer roller 27 only while the sheet 20 passes the transfer roller 27 in response to the detection by the sheet size sensor 48 and the sheet intake sensor 45. When the printing is completed and the sheet 20 passes the sheet ejection sensor 46, application of the voltage to the developing device 14 by the charging high voltage power source 50 is stopped. At the same time, rotation of the developing/transferring process motor 42 is stopped. The above-described operation is repeated thereafter.

Figure 1:
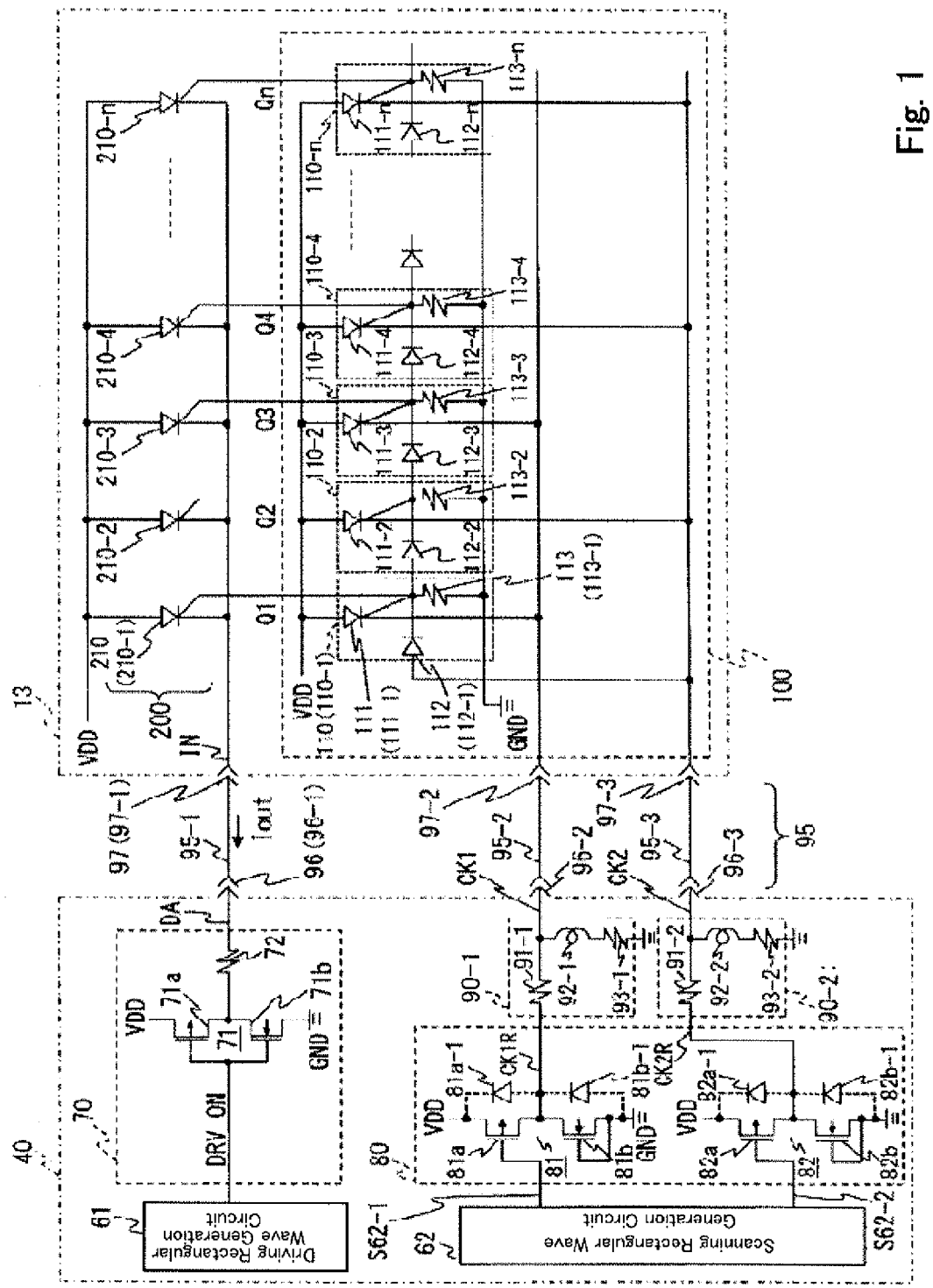
FIG. 1 is a block diagram that illustrates circuitry of a print controller and an optical print head shown in FIG. 5 according to the first embodiment.

(Print Controller and Optical Print Head in First Embodiment) FIG. 1 is a block diagram that illustrates circuitry of the print controller 40 and the optical print head 13 shown in FIG. 5 according to the first embodiment.

The optical print head 13 includes self scanning circuits 100 and light emitting element arrays 200 formed on the IC chips 13c shown in FIG. 4. The self scanning circuits 100 and the light emitting element arrays 200 are connected to the print controller 40 via a plurality of connection cables 95 (95-1 to 95-3) and a plurality of connection connectors 96 (96-1 to 96-3) and 97 (97-1 to 97-3).

The light emitting element array 200, which is scanned by the self scanning circuits 100, includes a plurality of P-gate light emitting thyristors 210 (210-1 to 210-m), for example, which are 3-terminal light emitting elements. For each light emitting thyristor 210, the anode is connected to a power source for power source voltage (VDD) (VDD power source), the cathode is connected to the connection connector 97-1 via a common terminal IN through which drive current Tout flows as data, and the gate is connected to respective ones of output terminals Q1-Qm of the self scanning circuits 100. Namely, the above light emitting thyristors 210 are connected to the common terminal IN in parallel. As discussed below, the light emitting thyristors 210-1 to 210-m are divided into a plurality of groups of light emitting thyristors 210-1 to 210-n. Each group is separately and simultaneously driven in parallel by respective ones of the self scanning circuits 100. Similarly, the output terminals Q1-Qm are divided into a plurality of groups of output terminals Q1-Qn. Each light emitting thyristor 210 emits light when a trigger signal (e.g., trigger current) flows to the gate while the power source voltage VDD is applied between the anode and cathode, and when the light emitting thyristor 210 is turned to the ON state as cathode current flows between the anode and the cathode. The total number of the light emitting thyristors 210-1 to 210-m (and output terminals Q1-Qm) is 4,992 (m=4,992) with the optical print head 13, which is capable of printing an A4-size sheet at a resolution of 600 dots per inch. These light emitting thyristors form the array.

Each self scanning circuit 100 is driven by a first 2-phase clock supplied from the print controller 40 via the connection connectors 96-2 and 96-3, the connection cables 95-2 and 95-3 and the connection connectors 97-2 and 97-3. The self scanning circuit 100 is a circuit that causes the light emitting element array 220 to perform ON/OFF switching by applying the trigger current thereto. The self scanning circuit 100 includes plural stages of circuits 110 (110-1 to 110-n; e.g., n=192) that use 3-terminal switching elements (e.g., P-gate self scanning thyristors) and is configured from self scanning shift resistors. The circuit 110 (110-1 to 110-n) of each stage that uses the self scanning thyristor is configured from a self scanning thyristor 111 (111-1 to 111-n), a diode 112 (112-1 to 112-n), and a resistor 113 (113-1 to 113-n). A first terminal (e.g., anode) of the self scanning thyristor 111 is connected to a first power source (e.g., VDD power source). The cathode of the diode 112 is connected to a control terminal (e.g., gate) of the self scanning thyristor 111. The resistor 113 is connected between the gate of the self scanning thyristor 111 and a second power source (e.g., ground GND).

Of the self scanning thyristor 111 (111-1, 111-3, . . . , 111-(n−1)) in the odd stage circuits 110-1, 110-3, . . . , 110-(n−1), the anode is connected to the VDD power source, and the second terminal (e.g., cathode) is connected to the connection connector 97-2. The gate is connected to ground GND via the resistor 113 (113-1, 113-3, . . . , 113-(n−1)) and is connected to the connection connector 97-3 via the cathode and anode of the diode 112 (112-1, 112-3, . . . , 112-(n−1)).

Of the self scanning thyristor 111 (111-2, 111-4, . . . , 111-n) in the even stage circuits 110-2, 110-4, . . . , 110-n, the anode is connected to the VDD power source, and the cathode is connected to the connection connector 97-3. The gate is connected to ground GND via the resistor 113 (113-2, 113-4, . . . , 113-n) and is connected to the gate of the self scanning thyristor 111 (111-1, 111-3, . . . , 111-(n−1)) of the previous stage via the cathode and anode of the diode 112 (112-1, 112-3, . . . , 112-(n−1)). In addition, the gate of the self scanning thyristor 111 (111-1 to 111-n) of each stage is connected to output terminals Q1-Qn, respectively, of the self scanning circuit 100.

The self scanning thyristor 111 of each of the circuits 110-1 to 110-n has a layer structure that is similar to that for the light emitting thyristor 210 in the light emitting element array 200 and performs similar circuit operations. Because the self scanning thyristor 111 does not require the light emitting function like the light emitting thyristor 210, the upper layer of the self scanning thyristor 111 is covered by a non-translucent material, such as a metal film, which blocks light. The cathode of the diode 112 is connected to the gate of the self scanning thyristor 111 of each stage. The diode 112 interconnects the gates of the adjacent self scanning thyristors 111. The diode 112 is provided to determine the scanning direction (e.g., direction to the right in FIG. 1) when sequentially turning on the light emitting thyristors 210-1 to 210-n.

In the self scanning circuit 100, the self scanning thyristors 111-1 to 111-n are alternatively turned on based on the first 2-phase clock supplied from the print controller 40. The ON state is transmitted to the light emitting element array 200 and functions to designate light emitting thyristors to emit light among the light emitting thyristors 210-1 to 210-n. The ON state of the thyristor 111 in the circuit 110 of each stage to be turned on is transmitted to the adjacent thyristor 111 for each 2-phase clock, and thereby performing a circuit operation similar to a shift resistor.

The print controller 40 includes, for example, a driving rectangular wave generation circuit 61 that outputs a drive command signal DRV ON, which is a driving rectangular wave signal; a plurality of data driving circuits 70 that passes the drive current Iout to the common terminal IN as data for driving the plurality of light emitting element arrays 200 by time division based on the drive command signal DRV ON; a scanning rectangular wave generation circuit 62 that outputs rectangular wave signals S62-1 and S62-2, which are scanning rectangular wave signals; and a clock driving circuit 80 and a resistor-inductor (RL) differential circuits 90-1 and 90-2 for generating 2-phase clocks supplied to the self scanning circuit 100 based on the rectangular wave signals S62-1 and S62-2. To simplify the explanation, only one pair of the driving rectangular wave generation circuit 61 and the data driving circuit 70 is shown in FIG. 1. The plurality of light emitting element arrays 200 includes 4,992 light emitting thyristors 210-1 to 210-m, for example. The plurality of light emitting element arrays 200 is formed by separating the light emitting thyristors 2104 to 210-m into a plurality of groups of light emitting thyristors 210-1 to 210-n. The groups of light emitting thyristors 210-1 to 210-n are separately driven simultaneously in parallel by the data driving circuits 70 respectively provided for each group.

Describing an example of typical design, 26 chips each including a light emitting array 200, in which 192 light emitting thyristors 210 (210-1 to 210-n) are arrayed, are arranged on a printed wiring board 13h as shown in FIG. 4. As a result, the required 4,992 light emitting thyristors 210-1 to 210-m are formed on the optical print head 13. At this time, the data driving circuits 70 are provided in correspondence with the 26 light emitting arrays 200. Therefore, the total number of output terminals from the data driving circuits 70 is 26.

On the other hand, the scanning rectangular wave generation circuit 62, the clock driving circuit 80 and the RL differential circuits 90-1 and 90-2 drive the chip that includes the arrayed self scanning circuits 100. The scanning rectangular wave generation circuit 62, the clock driving circuit 80 and the RL differential circuits 90-1 and 90-2 are required for not only simply generating the clocks but also controlling the energy to turn on the below-discussed self scanning thyristors 111. To perform fast operation of the optical print head 13, it is preferable to provide the scanning rectangular wave generation circuit 62, the clock driving circuit 80 and the RL differential circuits 90-1 and 90-2 for each self scanning circuit 100. However, if the data transmission by the optical print head 13 can be slow, the output terminals of the clock driving circuit 80 and the RL differential circuits 90-1 and 90-2 and the plurality of self scanning circuits 100 may be connected in parallel so that these circuits can be shared.

The driving device of the first embodiment is configured from the data driving circuits 70, the clock driving circuits 80, the RL differential circuits 90-1 and 90-2 and the self scanning circuits 100. The data driving circuit 70, the clock driving circuit 80, the RL differential circuits 90-1 and 90-2 are provided in the print controller 40 as shown in FIG. 1 but may be provided inside the optical print head 13.

The data driving circuit 70 is configured from a complementary metal-oxide semiconductor (MOS) transistor (hereinafter "CMOS") inverter 71 and a resistor 72. The CMOS inverter 71 inverts the drive command signal DRV ON supplied from the driving rectangular wave generation circuit 61. The resistor 72 is connected between the output terminal of the CMOS inverter 71 and the data terminal DA. The CMOS inverter 71 includes a P-channel MOS transistor (hereinafter "PMOS") 71a and an N-channel MOS transistor (hereinafter "NMOS") 71b. The PMOS 71a and the NMOS 71b are serially connected between the VDD power source and ground GND.

That is, of the PMOS 71a, the drive command signal DRV ON is inputted into the gate, the source is connected to the VDD power source, and the drain is connected to an end of the resistor 72. Of the NMOS 71b, the drive command signal DRV ON is inputted into the gate, the source is connected to ground GND, and the drain is connected to an end of the resistor 72. The other end of the resistor 72 is connected to the common terminal IN on the light emitting element array 200 side via the data terminal DA, the connection connector 96-1, the connection cable 95-1 and the connection connector 97-1.

The clock driving circuit 80 is configured from an output buffer 81 that drives the rectangular wave signal S62-1, an output buffer 82 that drives the rectangular wave signal S62-2, and output terminals CK1R and CK2R for outputting a second 2-phase clock, which are connected to the output side of the output buffers 81 and 82, respectively. The output buffers 81 and 82 have the same circuitry and have an open drain configuration that uses a switching element (e.g., PMOS, which is a first conductive MOS transistor). As discussed blow, the output buffers 81 and 82 are capable of generating a differential waveform (e.g., undershoot waveform) that is appropriate for triggering the gate of the self scanning thyristor 111 while maintaining a high (H) level output voltage.

That is, the output buffer 81 includes a PMOS 81a and a second conductive MOS transistor (e.g., NMOS) 81b. Of the PMOS 81a, the rectangular wave signal S62-1 is inputted into the gate, the source is connected to the VDD power source as the first power source, and the drain is connected to the drain of the NMOS 81b and the output terminal CK1R. Of the NMOS 81b, the source and the gate are connected to ground GND as the second power source. The NMOS 81b is always in the OFF state. Therefore, the PMOS 81a and the NMOS 81b form a PMOS open drain output buffer circuit. There is a parasitic diode 81a-1 between the substrate terminal and the drain of the PMOS 81a, and there is a parasitic diode 81b-1 between the substrate terminal and the drain terminal of the NMOS 81b. The anode and cathode of the diode 81a-1 are connected in parallel to the drain and source of the PMOS 81a, respectively. The anode and cathode of the diode 81b-1 are connected in parallel to the source and the drain of the NMOS 81b, respectively.

Similarly, the output buffer 82 includes a switching element (e.g., PMOS, which is the first conductive MOS transistor) 82a and a second conductive MOS transistor (e.g., NMOS) 82b. Of the PMOS 82a, the rectangular wave signal S62-2 is inputted into the gate, the source is connected to the VDD power source as the first power source, and the drain is connected to the drain of the NMOS 82b and the output terminal CK2R. Of the NMOS 82b, the source and the gate are connected to ground GND as the second power source. The NMOS 82b is always in the OFF state. Therefore, the PMOS 82a and the NMOS 82b form a PMOS open drain output buffer. There is a parasitic diode 82a-1 between the substrate terminal and the drain of the PMOS 82a, and there is a parasitic diode 82b-1 between the substrate terminal and the drain terminal of the NMOS 82b. The anode and cathode of the diode 82a-1 are connected in parallel to the drain and source of the PMOS 82a, respectively. The anode and cathode of the diode 82b-1 are connected in parallel to the source and the drain of the NMOS 82b, respectively.

The two RL differential circuits 90-1 and 90-2 have the same circuitry. The RL differential circuit 90-1 is connected between the output terminal CK1R of the clock driving circuit 80 and the clock terminal CK1. The RL differential circuit 90-2 is connected between the output terminal CK2R of the clock driving circuit 80 and the clock terminal CK2.

The RL differential circuit 90-1 is configured from a resistor 91-1, an inductor 92-1 and a resistor 93-1. The resistor 91-1 is connected between the output terminal CK1R and the clock terminal CK1. The inductor 92-1 and the resistor 93-1 are serially connected between ground GND, as the second power source, and a position between the resistor 91-1 and the clock terminal CK1. Similarly, the RL differential circuit 90-2 is configured from a resistor 91-2, an inductor 92-2 and a resistor 93-2. The resistor 91-2 is connected between the output terminal CK2R and the clock terminal CK2. The inductor 92-2 and the resistor 93-2 are serially connected between ground GND, as the second power source, and a position between the resistor 91-2 and the clock terminal CK2.

For the inductors 92-1 and 92-2, ferrite beads and the like may be used, in which a thick wiring layer is provided on or inside a surface layer of a ferrite material with high magnetic permeability and in which wiring is formed to penetrate from one end to the other end of an inductor terminal.

The clock driving circuit 80 is configured from the open drain output buffers 81 and 82 that use PMOS. Therefore, the output state of the output terminals CK1R and CK2R rises to the high level (hereinafter "H level") when the PMOS 81a and 82a are turned on. When the PMOS 81a and 82a are turned off, the output state of the output terminals CK1R and CK2R is rises to the high impedance (hereinafter "HiZ"). However because the output terminal CK1R is connected to ground GND via the resistor 91-1, the inductor 92-1 and the resistor 93-1, and because the output terminal CK2R is connected to ground GND via the resistor 91-2, the inductor 92-2 and the resistor 93-2, the voltage at the output terminals CK1R and CK2R falls to the low level (hereinafter "L level").

In the below description, to avoid complexity of the description, the explanation is made with a premise that the clock driving circuit 80 has two state values, H level and L level, in the output states thereof.

In FIG. 1, the resistors 91-1 and 91-2 are provided. However, depending on the driving capability of the clock driving circuit 80, the resistance values of the resistors 91-1 and 91-2 may be approximately zero. In that case, the resistors 91-1 and 91-2 may be omitted. Similarly, the resistors 93-1 and 93-2 may be omitted.

(Light Emitting Thyristor in First Embodiment) FIGS. 6A-6D illustrate a configuration of the light emitting thyristor 210 shown in FIG. 1.

Figure 6D:
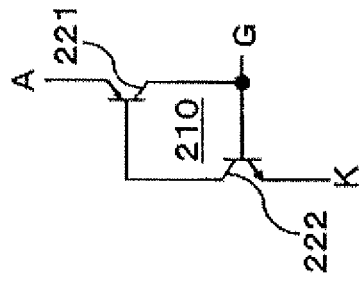
FIGS. 6A-6D illustrate a configuration of a light emitting thyristor shown in FIG. 1.
Figure 6C:
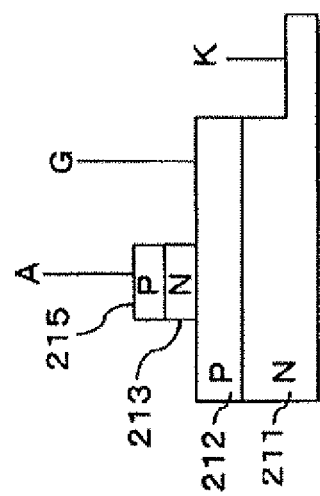
Figure 6B:
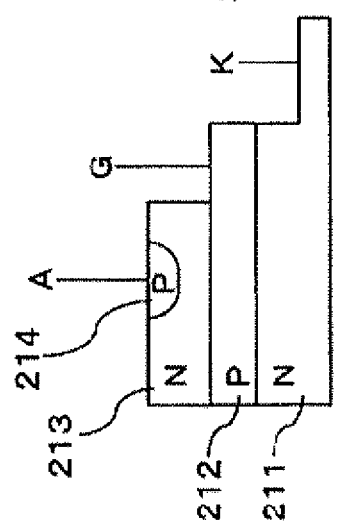
Figure 6A:
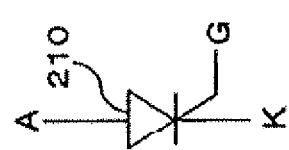

FIG. 6A shows circuit symbols of the light emitting thyristor 210 and includes an anode A, a cathode K and a gate G.

FIG. 6B illustrates a cross-sectional configuration of the light emitting thyristor 210. The light emitting thyristor 210 is fabricated by using a GaAs wafer substrate, for example, and by epitaxially growing predetermined crystals on the GaAs wafer substrate by a known metal organic-chemical vapor deposition (MO-CVD) method.

That is, a three-layer wafer with an NPN configuration is formed by sequentially layering an N-type layer (N-type region) 211, a P-type layer (P-type region) 212 and an N-type layer (N-type region) 213, after epitaxially growing the predetermined buffer layer and sacrifice layer (not shown). In the N-type layer 211, an N-type impurity is contained in an AlGaAs material. The P-type layer 212 is formed to contain a P-type impurity. The N-type layer 213 is formed to contain an N-type impurity. Next, using a known photolithographic method, a P-type impurity region 214 is selectively formed at a part of the N-type layer 213 on the top. Further, using a known etching method, element isolation is performed by forming a trench (not shown). In addition, a part of the N-type layer 211, which is the bottom layer of the light emitting thyristor 210, is exposed during the etching process, and metal wiring is formed in the exposed region to form the cathode K. At the same time, the anode A and the gate G are also formed in the P-type region 214 and the P-type region 212, respectively.

FIG. 6C is a cross-sectional configuration diagram that illustrates another form of the light emitting thyristor 210. In this cross-sectional configuration, the light emitting thyristor 210 is fabricated by using a GaAs wafer substrate, for example, and by epitaxially growing predetermined crystals on the GaAs wafer substrate by a known MO-CVD method.

That is, a four-layer wafer with a PNPN configuration is formed by sequentially layering the N-type layer 211, the P-type layer 212, the N-type layer 213 and a P-type layer 215, after epitaxially growing the predetermined buffer layer and sacrifice layer (not shown). In the N-type layer 211, an N-type impurity is contained in the AlGaAs material. The P-type layer 212 is formed to contain a P-type impurity. The N-type layer 213 is formed to contain an N-type impurity. The P-type layer 215 is formed to contain a P-type impurity. Further, using a known etching method, element isolation is performed by forming a trench (not shown). In addition, a part of the N-type layer 211, which is the bottom layer of the light emitting thyristor 210, is exposed during the etching process, and metal wiring is formed in the exposed region to form the cathode K. Similarly, a part of the P-type region 215, which is the top layer, is exposed, and metal wiring is formed in the exposed region to form the anode A. At the same time, the gate G is formed in the P-type region 212.

FIG. 6D is a representative circuit schematic of the light emitting thyristor 210 in contrast with FIGS. 6B and 6C. The light emitting thyristor 210 is formed from a PNP transistor (hereinafter "PNPTR") 221 and an NPN transistor (hereinafter "NPNTR") 222. The emitter of the PNPTR 221 corresponds to the anode A of the light emitting thyristor 210. The base of the NPNTR 222 corresponds to the gate G of the light emitting thyristor 210. The emitter of the NPNTR 222 corresponds to the cathode K of the light emitting thyristor 210. The collector of the PNPTR 221 is connected to the base of the NPNTR 222, and the base of the PNPTR 221 is connected to the collector of the NPNTR 222.

The light emitting thyristors 210 shown in FIGS. 6A-6D are configured by forming the AlGaAs layer on the GaAs wafer substrate. However, the light emitting thyristor 210 is not limited to this configuration, but a material, such as GaP, GaAsP or AlGaInP, may be used. Moreover, the light emitting thyristor 210 may be configured by forming a material, such as GaN, AlGaN or InGaN, on a sapphire substrate.

(Schematic Operation of Print Controller and Optical Print Head in First Embodiment) When the drive command signal DRV ON, which is outputted from the driving rectangular wave generation circuit 61 in the print controller 40, is at the L level, for example, the PMOS 71a, which forms the CMOS inverter 71 in the data driving circuit 70, is turned to the ON state, and the NMOS 71b is turned to the OFF state. Therefore, the voltage at the data terminal DA rises to the H level via the resistor 72. As such, the common terminal IN and the cathode of each light emitting thyristor 210 on the optical print head 13 side rises to the H level. As a result, the voltage between the anode and cathode of each light emitting thyristor 210 falls to approximately zero (0 V), so that the drive current Iout, which flows between the anode and cathode of the light emitting thyristor 210, also falls to zero. Thereby, all of the light emitting thyristors 210-1 to 201-n are turned to the non-light emitting state.

On the other hand, when the drive command signal DRV ON is at the H level, the PMOS 71a, which configures the CMOS inverter 71, is turned to the OFF state, and the NMOS 71b is turned to the ON state. Therefore, the data terminal DA falls to the L level via the resistor 72. As a result, the voltage at the common terminal IN also falls to approximately ground GND potential (≈0 V) via the connection connector 96-1, the connection cable 95-1 and the connection connector 97-1. Thus, approximate power source voltage VDD is applied between the anode and cathode of each light emitting thyristor 210.

At this time, among the light emitting thyristors 210-1 to 210-n, the gate of the light emitting thyristors 210, which are instructed by the self scanning circuit 100 to emit light, selectively rises to the H level. As a result, the trigger current is generated at the gate of the light emitting thyristors 210, and thereby, the thyristors 210, which are instructed to emit light, are turned on. The current that flows into the cathode of the tuned-on light emitting thyristors 210 is the current that flows into the data terminal DA (i.e., drive current Tout) and causes the light emitting thyristor 210 to turn to the light emission state to generate light emitting power based on the value of the drive current Iout.

That is, to consider the operation of the light emitting thyristors 210-1 to 210-n, taking into account the thyristors 111 (111-1 to 111-n) in the circuits 110-1 to 110-n of the self scanning circuit 100 that is turned on, the power source voltage VDD is applied to the anode of the light emitting thyristors 210. When the voltage at the cathode falls to the L level, voltage is applied between the anode and cathode of the light emitting thyristors 210. On the other hand, because the gate of each thyristor 111 in the self scanning circuit 100 and the gate of each light emitting thyristor 210 are respectively connected to each other, voltage is also applied between the gate and cathode of the thyristors 111. At this time, because the gate of the light emitting thyristors 210 among the light emitting thyristors 210-1 to 210-n, which have been instructed by the self scanning circuit 100 to emit light, selectively rises to the H level, the trigger current is generated at the gate of the light emitting thyristors 210, and thereby the light emitting thyristors 210, which have been instructed to emit light, are turned on. At this time, the current that flows into the cathode of the light emitting thyristors 210 is the drive current Iout that flows into the data terminal DA and causes the light emitting thyristor 210 to turn to the light emission state to generate light emitting power based on the value of the drive current Iout.

Figure 7:
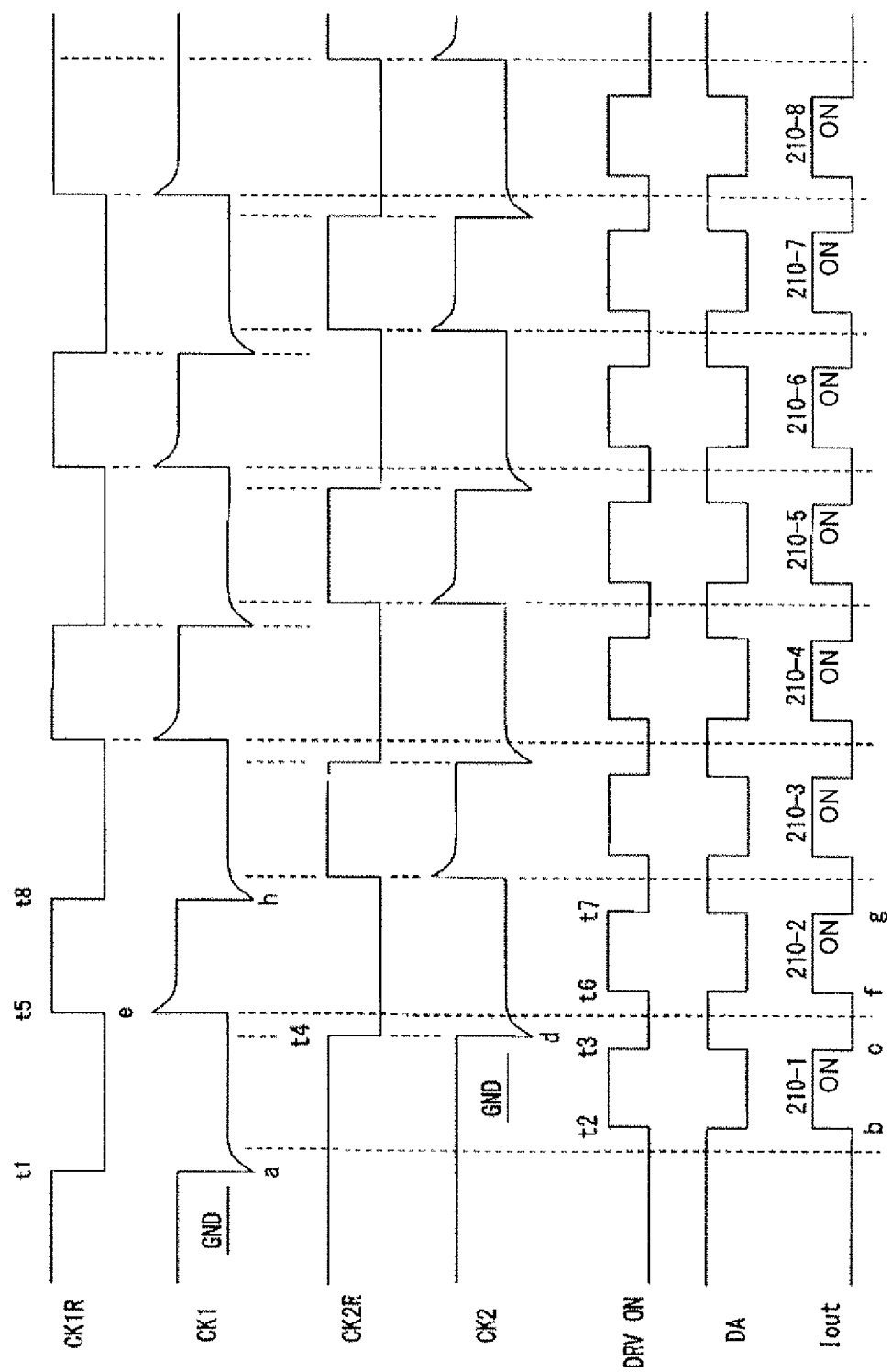
FIG. 7 is a timing chart that illustrates switching of the circuit shown in FIG. 1.

(Detailed Operation of Print Controller and Optical Print Head in First Embodiment) FIG. 7 a timing chart that illustrates detailed operation of the optical print head 13 and the print controller 40 shown in FIG. 1.

FIG. 7 shows operational waveforms during a case in which the light emitting thyristors 210-1 to 210-n (e.g., n=8) in FIG. 1 are sequentially turned on in a single line scanning during the print operation in the image forming device 1 shown in FIG. 2.

In the case of the self scanning circuit 100 that uses the self scanning thyristors 111 as in the first embodiment, 2-phase clocks that are supplied from the clock terminals CK1 and CK2 are used. The 2-phase clocks are driven by the clock driving circuit 80 that includes the output terminals CK1R and CK2R.

In the timing chart shown in FIG. 7, in the state shown at the left end part, the rectangular wave signals S62-1 and S62-2 outputted from the scanning rectangular wave generation circuit 62 are inverted by the output buffers 81 and 82, and the signals of the output terminals CK1R and CK2R rise to the H level.

The output terminal CK1R of the clock driving circuit 80 is connected to the clock terminal CK1 via the resistor 91-1. The clock terminal CK1 is connected to ground GND via the serial circuit of the inductor 92-1 and the resistor 93-1. Similarly, the output terminal CK2R of the clock driving circuit 80 is connected to the clock terminal CK2 via the resistor 91-2. The clock terminal CK2 is connected to ground GND via the serial circuit of the inductor 92-2 and the resistor 93-2. As a result, the potential of the clock terminal CK1 is the H level potential that is obtained by dividing the H level potential from the output terminal CK1R by the resistors 91-1 and 93-1.

At this time, by setting the resistance of the resistor 93-1 much greater than the resistance of the resistor 91-1 (resistance of the resistor 93-1>>resistance of the resistor 91-1), it is easy to set the H level at a value close to the power source voltage VDD. If the resistor 91-1 is omitted, the H level potential may be made approximately equal to the power source voltage VDD. Similarly, the potential of the clock terminal CK2 is the H level potential obtained by dividing the H level potential from the output terminal CK2R by the resistors 91-2 and 93-2.

As described above, in the state shown at the left end part of the timing chart in FIG. 7, the signals from the clock terminals CK1 and CK2 are both at the H level. Therefore, the cathodes of a group of the self scanning thyristors 111-1, 111-3, 111-5 and 111-7 in the odd-stage circuits 110-1, 110-3, 110-5 and 110-7 and a group of the self scanning thyristors 111-2, 111-4, 111-6 and 111-8 in the even-stage circuit 110-2, 110-4, 110-6 and 110-8 rise to the H level. Accordingly, the self scanning thyristors 111-1 to 111-8 are in the OFF state. At this time, the drive command signal DRV ON is at the L level, and the output terminal of the CMOS inverter 71 is at the H level. The cathodes of the light emitting thyristors 210-1 to 210-8 are also at the H level via the resistor 72, the data terminal DA, the connection connector 96-1, the connection cable 95-1, the connection connector 97-1 and the common terminal IN. Therefore, the light emitting thyristors 210-1 to 210-8 are in the OFF state.

Processes (1) and (2) for turning on the thyristors 111-1 and 111-2 in the first-stage circuit 110-1 and the second-stage circuit 110-2 are described below.

(1) Process for Turning on Thyristor 111-1 in First-Stage Circuit 110-1

At t1 in FIG. 7, the rectangular wave signal S62-1 outputted from the scanning rectangular wave generation circuit 62 is inverted by the output buffer 81 in the clock driving circuit 80, and the output terminal CK1R falls to the L level. Then, back voltage is generated at the inductor 92-1, causing the voltage at the clock terminal CK1 to fall below ground GND potential and to form a differential waveform (e.g., undershoot waveform) as shown at part a.

At this time, taking the thyristor 111-1 in the first-stage circuit 110-1 into account, the anode voltage is the power source voltage VDD, which is 3.3 V for a typical design example. In contrast, the anode of the diode 112-1 is connected to the clock terminal CK2, and the voltage of the clock terminal CK2 is at the H level, which is close to the power source voltage VDD. Therefore, the H level potential passes between the anode and cathode of the diode 112-1, and thereby the current flows to the clock terminal CK1 via the gate and cathode of the thyristor 111-1. As a result, the thyristor 111-1 is turned on by this current as trigger current.

At t2, the drive command signal DRV ON, which is outputted from the driving rectangular wave generation circuit 61, rises. The drive command signal DRV ON is inverted by the CMOS inverter 71, so that the voltage at the data terminal DA falls to the L level via the resistor 72. As a result, voltage that is approximately equivalent to the power source voltage VDD is applied between the anode and cathode of the light emitting thyristor 210-1. At this time, because the thyristor 111-1 is on, the light emitting thyristor 210-1, which shares the gate voltage with the gate of the thyristor 111-1, turns on, and the drive current Iout is generated at the cathode of the light emitting thyristor 210-1 as shown at part b. Therefore, the light emitting output is generated based on the value of the drive current Iout.

At t3, the drive command signal DRV ON falls. The drive command signal DRV ON is inverted by the CMOS inverter 71, and the data terminal DA rises to the H level. As a result, voltage between the anode and cathode of the light emitting thyristor 210-1 falls to approximately zero (0 V), and thereby the light emitting thyristor 210-1 is turned off. The drive current Iout falls to approximately zero as shown at part c.

In the first embodiment, a latent image is formed on the photosensitive drum 11 shown in FIG. 2 by the light emitting thyristor 210-1 emitting light. An amount of exposure energy at this time is a product of the light emission power based on the value of the drive current Iout and the exposure time (=t3−t2). Therefore, even if there is a difference in luminous efficiency originated from the fluctuations in manufacturing the light emitting thyristor 210-1 and the like, the fluctuations in the amount of exposure energy may be corrected by adjusting the exposure time (=t3−t2) for each light emitting thyristor 210-1.

In addition, when the light emission by the light emitting thyristor 210-1 is not necessary, the drive command signal DRV ON is maintained at the L level between t2 and t3. Therefore, the light emission by the light emitting thyristor 210-1 may be controlled by the drive command signal DRV ON.

(2) Process for Turning on Thyristor 111-2 in Second-Stage Circuit 110-2

At t4 shown in FIG. 7, the rectangular wave signal S62-2, which is outputted from the scanning rectangular wave generation circuit 62, is inverted by the output buffer 82 in the clock driving circuit 80, so that the voltage at the output terminal CK2R falls to the L level. At this time, the back voltage is generated at the inductor 92-2, causing the voltage at the clock terminal CK2 to fall below ground GND potential and to form the undershoot waveform, as shown at part d.

Taking the thyristor 111-2 in the second-stage circuit 110-2 into account, the anode voltage is the power source voltage VDD, which is 3.3 V for a typical design example. In contrast, the anode of the diode 112-2 is connected to the gate of the thyristor 111-1. Because the thyristor 111-1 is in the ON state, the anode voltage of the diode 112-2 is at the H level, which is close to the power source voltage VDD. Therefore, the current flows to the clock terminal CK2 from the gate of the thyristor 111-1, through the anode and cathode of the diode 112-2, and via the gate and cathode of the thyristor 111-2. As a result, the thyristor 111-2 is turned on by this current as the trigger current.

At t5, the voltage at the output terminal CK1R of the clock driving circuit 80 rises to the H level. At this time, the back voltage is generated at the inductor 92-1, causing overshoot voltage at the clock terminal CK1 as shown at part e. The voltage between the anode and cathode of the thyristor 111-1 is rapidly reduced, and thereby the thyristor 111-1 is turned on.

At t6, the drive command signal DRV ON rises and is inverted by the CMOS inverter 71, so that the data terminal DA falls to the L level. When the data terminal DA falls to the L level, voltage that is approximately equivalent to the power source voltage VDD is applied between the anode and cathode of the light emitting thyristor 210-2. As discussed above, at t6, the thyristor 111-2 is in the ON state, and the thyristor 111-1 is in the OFF state.

Because the thyristor 111-2 is on, the light emitting thyristor 210-2, which shares the gate voltage with the gate of the thyristor 111-2, is turned on. At the cathode of the thyristor 210-2, the drive current Iout is generated as shown at part f, and the light emission power is generated based on the value of the drive current Iout.

At t7, the drive command signal DRV ON falls. The drive command signal DRV ON is inverted by the CMOS inverter 71, and the data terminal DA rises to the H level. As a result, voltage between the anode and cathode of the light emitting thyristor 210-2 falls to approximately zero (0 V), and thereby the light emitting thyristor 210-1 is turned off. The drive current Iout falls to approximately zero as shown at part g.

Similarly, the light emitting thyristors 210-3 to 210-8 are sequentially turned on thereafter by sequentially transitioning the signals at the output terminals CK1R and CK2R in the clock driving circuit 80 and turning on and off the drive command signal DRV ON in each light emitting thyristor.

As described in detail using FIG. 7, the clocks supplied from the clock terminals CK1 and CK2 have formations in which similar waveforms are repeated with different phases. By sequentially inputting these clock waveforms to the group of the odd-stage self scanning thyristors 111-1, 111-3, 111-5 and 111-7 and to the group of the even-stage self scanning thyristors 111-2, 111-4, 111-6 and 111-8, the self scanning thyristors 111-1 to 111-8 at each stage are sequentially turned on. The different phases include phases that are opposite to each other and phases that are shifted from each other.

The gate voltage of the self scanning thyristor 111 in the ON state is at the H level, which is approximately equivalent to the power source voltage VDD. The gate voltage of the self scanning thyristor 111 in the OFF state is at the L level, which is approximately equivalent to ground GND potential. As discussed above, as a result of sequentially turning on the self scanning thyristor 111-1 to 111-8, the self scanning circuit 100 shown in FIG. 1 operates as a shift resistor. The gates of the self scanning thyristors 111-1 to 111-8 function as the output terminals Q1-Q8 of the self scanning circuit 100. Therefore, the position of the light emitting thyristors in the light emitting element array 200 can be designated, and the designation of turning on and off, as well as the time for light emission, for the light emitting thyristors 210-1 to 210-8 can be controlled based on the value of the data terminal DA.

Figure 8B:
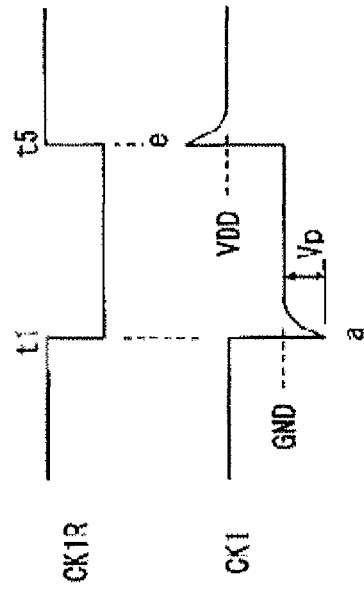
FIG. 8B illustrates a part of the timing chart shown in FIG. 7.
Figure 8A:
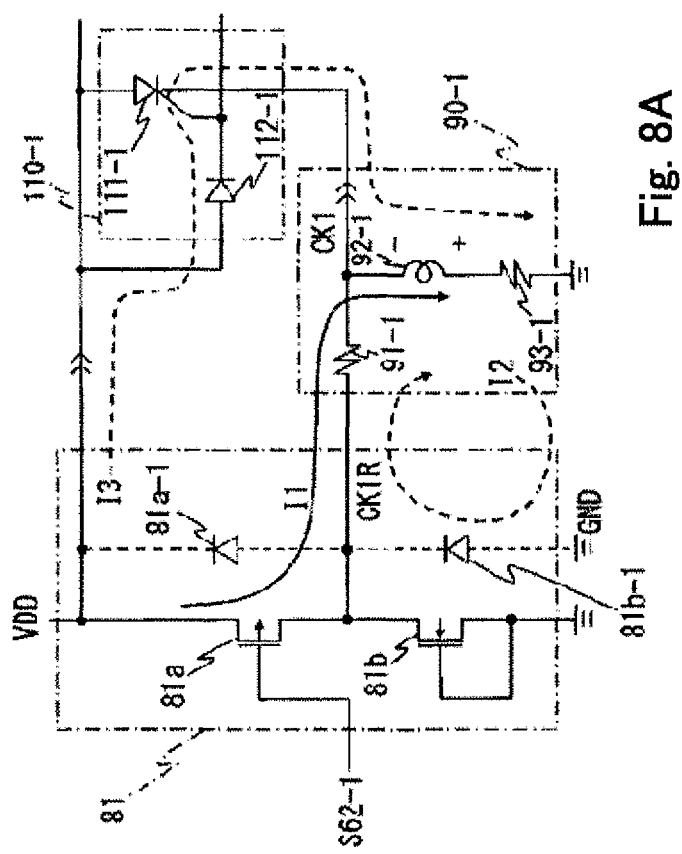
FIG. 8A illustrates a part of a clock driving circuit, a resistor-inductor (RL) differential circuit and a first-stage circuit shown in FIG. 1.

(Explanation of Undershoot Waveform in FIG. 7) FIG. 8A illustrates a circuit diagram of a part of the output buffer 81 in the clock driving circuit 80, the RL differential circuit 90-1 and the first-stage circuit 110-1 shown in FIG. 1. FIG. 8B illustrates a voltage waveform chart of a part of the timing chart shown in FIG. 7.

In FIG. 8A, the anode of the thyristor 111-1 is connected to the VDD power source. The cathode of the thyristor 111-1 is connected to the clock terminal CK1 and further to the output terminal CK1R via the resistor 91-1. In addition, the clock terminal CK1 is connected to ground GND via the inductor 92-1 and the resistor 93-1. The cathode of the diode 112-1 is connected to the gate of the thyristor 111-1. The anode of the diode 112-1 is connected to the clock terminal CK2 as shown in FIG. 1. However, because the signal level at the anode of the diode 112-1 in the turn-on process of the thyristor 111-1 is the H level, which is approximately equivalent to the power source voltage VDD, the anode of the diode 112-1 is connected to the VDD power source in FIG. 8A for the purpose of simplifying the drawing.

A case in which the output terminal CK1R of the clock driving circuit 80 is at the H level, for example, is considered.

This corresponds to the state at the left end part of the timing chart shown in FIG. 7. At this time, the current I1 flows in the direction shown by the solid line arrow in FIG. 8A. The current I1 flows on a path from the VDD power source, through the PMOS 81a, the resistor 91-1, the inductor 92-1 and the resistor 93-1 and to ground GND.

Next, at t1 in FIG. 7, the PMOS 81a is turned to the OFF state. Then, the back voltage is generated at the inductor 92-1 in the direction marked by symbols "+" and "−" in FIG. 8A, causing the current I2 flowing in the direction indicated by the broken line arrow. The current I2 flows on a first current path that passes through the inductor 92-1, the resistor 93-1, the diode 81b-1 and the resistor 91-1 and returns to the inductor 92-1.

At this time, taking the first current path into account, because the anode of the diode 81b-1 is connected to ground GND, the potential of the output terminal CK1R falls lower than ground GND potential by the forward voltage of the diode 81b-1. In addition, the potential of the output terminal CK1 falls lower than the forward voltage of the diode 81b-1 by the voltage drop occurred at both ends of the resistor 93-1.

As a result, as shown by the broken line arrow, the current I3 flows on a second current path from the VDD power source, through the diode 112-1, the gate and cathode of the thyristor 111-1, the inductor 92-1 and the resistor 93-1, and to ground GND. The current that flows between the gate and cathode of the thyristor 111-1 becomes the trigger current to turn on the thyristor 111-1.

FIG. 8B shows a voltage waveform that describes the process described in FIG. 8A. When the output terminal CK1R falls to the L level, an undershoot part is generated at the clock terminal CK1 as indicated by part a. Therefore, the potential can be lower than ground GND potential by the amount of voltage Vp.

In the typical design example, the power source voltage VDD is 3.3 V. When the forward voltage Vf of the diode 112-1 is 1.6 V and when the forward voltage Vgk of the PN junction generated between the gate and cathode of the thyristor 111-1 is also 1.6 V, the following equation must be met in order to generate the current I3 on the second path:

$$Vf+Vgk<VDD+Vp$$

At this time, if there is no undershoot part a on the waveform of the clock terminal CK1 shown in FIG. 8B and if Vp=0, the sum of Vf and Vgk becomes the following value:

$$Vf+Vgk=1.6+1.6=3.2V$$

Therefore, the sum becomes approximately the same value as the power voltage VDD. Thus, the trigger current that is enough to turn on the thyristor 111-1 cannot be obtained.

On the other hand, by providing the value Vp=0.6 V as the undershoot waveform, the sum of VDD and Vp becomes the following value:

$$VDD+Vp=3.3\ 0.6=3.9V$$

This value allows a large enough gate trigger current to turn on the thyristor 111-1.

Figure 9:
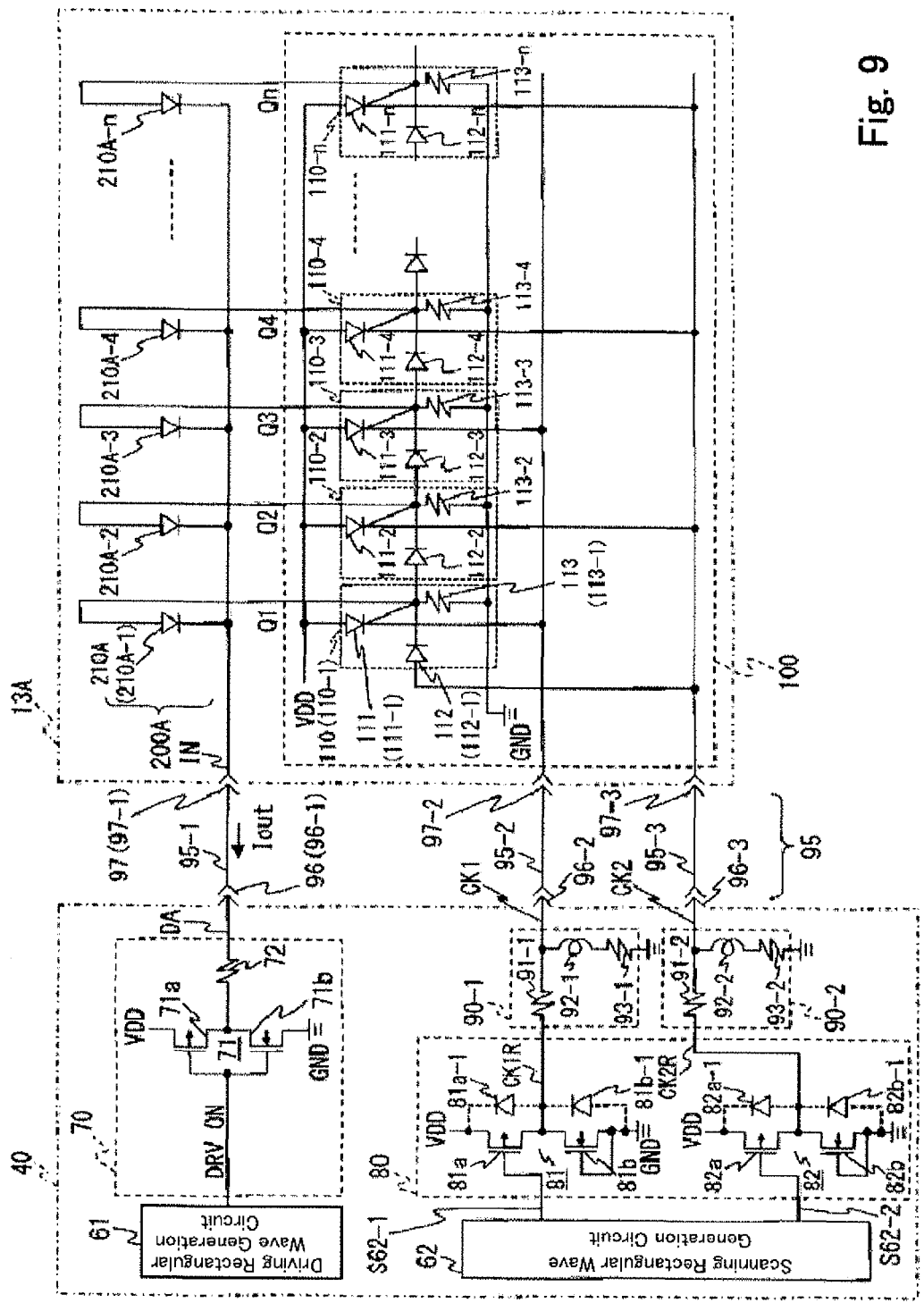
FIG. 9 is a block diagram that illustrates circuitry of the print controller and the optical print head according to a first exemplary modification of the first embodiment shown in FIG. 1.

(First Exemplary Modification of First Embodiment) FIG. 9 is a block diagram that illustrates schematic circuitry of the print controller 40 and an optical print head 13A according to a first exemplary modification of the first embodiment shown in FIG. 1. Like reference numerals are used for elements that are common with the elements in FIG. 1.

The first exemplary modification includes the print controller that is similar to that in the first embodiment. To the print controller 40, the optical print head 13A, which is different from the optical print head 13 in the first embodiment, is connected via a plurality of the connection connectors 96 (96-1 to 96-3), the connection cables 95 (95-1 to 95-3) and the connection connectors 97 (97-1 to 97-3), which are similar to those in the first embodiment. The optical print head 13A of the first exemplary modification includes the self scanning circuit 100, which is similar to that in the first embodiment, and a light emission element array 200A, which includes a different configuration from the light emission element array 200 in the first embodiment.

The light emission element array 200A includes a plurality of 2-terminal light emitting elements (e.g., P gate-type LED) 210A (210A-1 to 210A-m). For each LED 210A, the anode is connected to respective ones of the output terminals Q1-Qm of the self scanning circuits 100, and the cathode is connected to the connection connector 97-1 via the common terminal IN, through which the drive current Iout flows. Similar to the first embodiment, the LEDs 210A-1 to 210A-m are divided into a plurality of groups of LEDs 210A-1 to 210A-n. Each group is separately and simultaneously driven in parallel by respective ones of the self scanning circuits 100. Similarly, the output terminals Q1-Qm are divided into a plurality of groups of output terminals Q1-Qn. The LED 210A emits light when the predetermined voltage is applied between the anode and cathode and when the LED 210A is turned to the ON state as cathode current flows between the anode and cathode thereof. Similar to the first embodiment, the total number of the LEDs 210A-1 to 210A-m (and the output terminals Q1-Qm) may be 4,992 with the optical print head 13A, which is capable of printing an A4-size sheet at a resolution of 600 dots per inch. These LEDs form the array.

The print controller 40 and the optical print head 13A with such configuration operate as follows.

When the drive command signal DRV ON outputted from the driving rectangular wave generation circuit 61 is at the L level, for example, the data terminal DA rises to the H level via the resistor 72 because of the CMOS inverter 71 in the data driving circuit 70. As such, the common terminal IN and the cathode of each LED 210A on the side of the optical print head 13A rise to the H level via the connection connector 96-1, the connection cable 95-1 and the connection connector 97-1. As a result, all of the LEDs 210A-1 to 201A-n are in the non-light emitting state.

On the other hand, when the drive command signal DRV ON is at the H level, the data terminal DA falls to the L level via the resistor 72 because of the CMOS inverter 71. As a result, the common terminal IN also falls to approximately ground GND potential (≈0 V) via the connection connector 96-1, the connection cable 95-1 and the connection connector 97-1. At this time, among the LEDs 210A-1 to 210A-n, by causing the anode of the LED 210A designated by the self scanning circuit 100 to emit light, to selectively rise to the H level, the LED 210A designated by the self scanning circuit 100 to emit light is turned to the ON state. The current that flows to the cathode of the LED 210A in the ON state is the current that flows to the data terminal DA (i.e., drive current Iout), and the LED 210A is turned to the light emitting state and generates light emission power based on the value of the drive current Iout. The first exemplary modification performs operation substantially similarly to the first embodiment.

Figure 10:
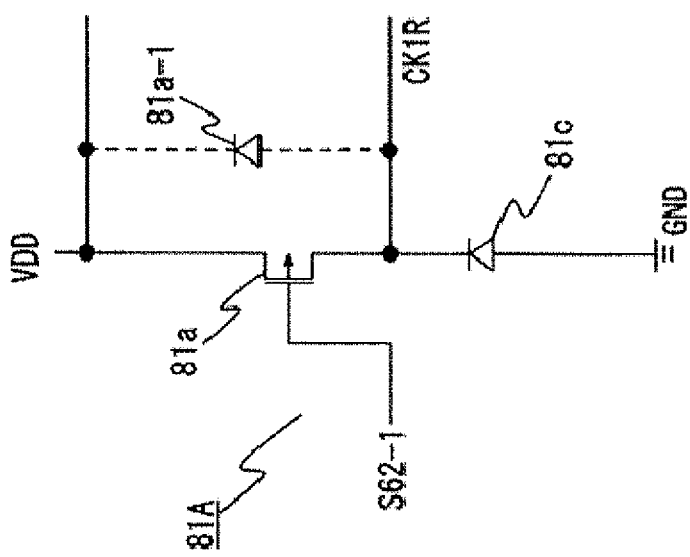
FIG. 10 is a circuit diagram that illustrates an output buffer according to a second exemplary modification of FIGS. 1 and 9.

(Second Exemplary Modification of First Embodiment) FIG. 10 is a circuit diagram that illustrates an output buffer according to the second exemplary modification of FIGS. 1 and 9. Like reference numerals are used for elements that are common with the elements in FIGS. 1 and 9.

In an output buffer 81A in the second exemplary modification, a standard diode 81e is provided instead of the NMOS 81b and the parasitic diode 81b-1 in the output buffer 81 shown in FIGS. 1 and 9. Of the diode 81c, the cathode is connected to the output terminal CK1R, and the anode is connected to ground GND. In addition, although not shown, a standard diode is provided instead of the NMOS 82b and the parasitic diode 82b-1 in the output buffer 82 shown in FIGS. 1 and 9.

The diode 81c includes a function to allow the current I2 to flow from the side of ground GND to the side of the output terminal CK1R, for example. Even with such diode 81c, the operation similar to those in FIGS. 1 and 9 is performed.

(Advantages of First Embodiment and First and Second Exemplary Modifications) The following advantages (a) and (b) are achieved according to the first embodiment and the first and second exemplary modifications.

(a) For the driving of the self scanning circuit with the conventional configuration, CR differential circuits are provided at the positions that respectively correspond to the RL differential circuits 90-1 and 90-2 shown in FIG. 1. The 2-phase clocks are outputted from the clock terminal CK1 and CK2 by generating the undershoot waveform at part a in FIG. 8B. At this time, two clock output terminals are provided for each of the clock terminals CK1 and CK2 in the CR differential circuit because the direct current component cannot be transmitted.

That is, in the optical print head 13, a large number of chips of the self scanning circuits 100 is provided, and the operation of the chips is simultaneously performed in parallel for high speed operation. A 2-phase clock is used as a data transfer clock for the large number of the self scanning circuits 100, and the 2-phase clock is inputted to each self scanning circuit 100. Therefore, four output terminals are required for driving one chip of the self scanning circuit 100 in the conventional clock driving circuit (which corresponds to the clock driving circuit in the first embodiment) for supplying the clocks to the self scanning circuit 100.

Because the large number of the chips of the self scanning circuits 100 is arranged in an optical print head 13, the total number of output terminals provided in a clock driving circuit is enormous. If the number of terminals are controlled so that the terminals can be accommodated in an LSI package, a large number of chips of the self scanning circuits 100 that are connected in parallel to and driven by a clock driving circuit is required, causing waveform rounding. As a result, there is a problem that the operation of the optical print head 13 cannot be performed at high speed.

To solve the problem, according to the first embodiment and the first and second exemplary modifications, the clock driving circuit 80 has an open drain configuration that uses a PMOS, and the output signals from the clock driving circuit 80 is differentiated at the RL differential circuits 90-1 and 90-2 to generate the undershoot waveform shown at part a in FIG. 8B. Therefore, only one of each of the output terminals CK1R and CK2R is sufficient for each clock in the clock driving circuit 80, which reduces the number of desired terminals by half compare to the conventional configuration. As a result, not only the data transfer speed at the optical print head 13 or 13A is improved, but also the number of the output terminals CK1R and CK2R in the clock driving circuit 80 is reduced. Therefore, the reduction of circuit size and lowering of cost are achieved.

(b) According to the image forming device 1 in the first embodiment and the first and second exemplary modifications, with the optical print head 13 or 13A, a high quality image forming device 1 is provided, which has high space efficiency and light extraction efficiency. That is, by using the print head 13 or 13A, the advantages can be obtained not only in the full color image forming device 1 in the first embodiment and the first and second exemplary modifications but also in monochrome and multi-color image forming devices. In particular, there are more advantages in the full color image forming device 1 that uses a large number of the print heads 13 or 13A as the exposure device.

Second Embodiment

In the image forming device 1 according to the second embodiment, the circuitry of the optical print head 13B and the print controller 40B is different from that of the optical print head 13 and the print controller 40 in the first embodiment. Therefore, the differences are described.

(Print Controller and Optical Print Head in Second Embodiment) FIG. 11 is a block diagram that illustrates circuitry of a print controller 40B and an optical print head 13B according to the second embodiment. The elements that are common with those in FIG. 1 showing the first embodiment are indicated by the same reference numerals.

The optical print head 13B in the second embodiment includes a self scanning circuit 100B and light emitting element arrays 200B which have different configurations from those for the self scanning circuit 100 and the light emitting element arrays 200 in the first embodiment. The self scanning circuit 100B and the light emitting element arrays 200B are connected to the print controller 40B having a different configuration from that of the print controller 40 in the first embodiment, via the connection cable 95 (95-1 to 95-3) and a plurality of the connection connectors 96 (96-1 to 96-3) and 97 (97-1 to 97-3), which are similar to those in the first embodiment.

The light emitting element arrays 200B, which are scanned by the self scanning circuit 100B, include a plurality of N-gate light emitting thyristors 210B (210B-1 to 210B-m) as 3-terminal light emitting elements. For each of the light emitting thyristors 210B, the anode is connected to the connection connector 97-1 via the common terminal IN through which the drive current Iout flows, the cathode is connected to ground GNI), and the gate is connected to the respective output terminals Q1-Qm of the self scanning circuits 100B. Similar to the first embodiment, the light emitting thyristors 210B-1 to 210B-m are divided into a plurality of groups of light emitting thyristors 210B-1 to 210B-n. Each group is separately and simultaneously driven in parallel by respective ones of the self scanning circuits 100B. Similarly, the output terminals Q1 Qm are divided into a plurality of groups of output terminals Q1-Qn. Moreover, similar to the first embodiment, the total number of the light emitting thyristors 210B-1 to 210B-m (and output terminals Q1-Qm) is 4,992 with the optical print head 13B that is capable of printing an A4-size sheet at a resolution of 600 dots per inch. These light emitting thyristors form the array.

Each self scanning circuit 100B is driven by the first 2-phase clock supplied from the print controller 4013 via the connection connectors 96-2 and 96-3, the connection cables 95-2 and 95-3 and the connection connectors 97-2 and 97-3. The self scanning circuit 100B is a circuit that causes the light emitting element array 200B to perform the ON/OFF operation by applied the trigger current thereto. The self scanning circuit 100B includes plural stages of circuits 110B (110B-1 to 110B-$n$; e.g., n=192, which is similar to the first embodiment) that use the N-gate self scanning thyristors and is configured from self scanning shift resistors. The circuit 110B (110B-1 to 110B-n) of each stage that uses the self scanning thyristor is configured from a self scanning thyristor 111B (111B-1 to 111B-n), a diode 112B (112B-1 to 112B-$n$), and a resistor 113B (113B-1 to 113B-n). A first terminal (e.g., anode) of the self scanning thyristor 111B is connected to a first power source (e.g., ground GND). The anode of the diode 112B is connected to a control terminal (e.g., gate) of the self scanning thyristor 111B. The resistor 113B is connected between the gate of the self scanning thyristor 111B and a second power source (e.g., VDD power source).

Of the self scanning thyristor 111B (111B-1, 111B-3, ..., 111B-(n−1)) in the odd stage circuits 110B-1, 110B-3, 110B-(n−1), the second terminal (e.g., anode) is connected to the connection connector 97-2, and the cathode is connected to ground GND. The gate is connected to the VDD power source via the resistor 113B (113B-1, 113B-3, ..., 113B-(n−1)) and is connected to the connection connector 97-3 via the cathode and anode of the diode 112B (112B-1, 112B-3, ..., 112B-(n−1)).

Of the self scanning thyristor 111B (111B-2, 111B-4, ..., 111B-$n$) in the even stage circuits 110B-2, 110B-4, ..., 110B-n, the second terminal (e.g., anode) is connected to the connection connector 97-3, and the cathode is connected to ground GND. The gate is connected to the VDD power source via the resistor 113B (113B-2, 113B-4, ..., 113B-n) and is connected to the gate of the self scanning thyristor 111B (111B-1, 111B-3, 111B-(n−1)) of the previous stage via the cathode and anode of the diode 112B (112B-1, 112B-3, ..., 112B-(n−1)). In addition, the gate of the self scanning thyristor 111B (111B-1 to 111B-n) of each stage is connected to output terminals Q1-Qn, respectively, of the self scanning circuit 100B.

The self scanning thyristor 111B of each of the circuits 110B-1 to 110B-n has a layer structure that is similar to that for the light emitting thyristor 210B in the light emitting element array 200B and performs similar circuit operations. Similar to the first embodiment, because the self scanning thyristor 111B does not require the light emitting function like the light emitting thyristor 210B, the upper layer of the self scanning thyristor 111B is covered by a non-translucent material, such as a metal film, which blocks light. The anode of the diode 112B is connected to the gate of the self scanning thyristor 111B of each stage. The diode 112B interconnects the gates of the adjacent self scanning thyristors 111B similar to the first embodiment. The diode 112B is provided to determine the scanning direction (e.g., direction to the right in FIG. 11) when sequentially turning on the light emitting thyristors 210B-1 to 210B-n.

In the self scanning circuit 100B, similar to the first embodiment, the self scanning thyristors 111B-1 to 111B-n are alternatively turned on based on the first 2-phase clock supplied from the print controller 40B. The ON state is transmitted to the light emitting element array 200B and functions to designate light emitting thyristors to emit light among the light emitting thyristors 210B-1 to 210B-n. The ON state of the thyristor 111B in the circuit 110B of each stage to be turned on is transmitted to the adjacent thyristor 111B for each 2-phase clock, and thereby performing a circuit operation similar to a shill resistor.

The print controller 40B includes, for example, a driving rectangular wave generation circuit 6113, a clock driving circuit 80B and RL differential circuits 90B-1 and 90B-2, which are different from the driving rectangular wave generation circuit 61, the clock driving circuit 80 and the RL differential circuits 90-1 and 90-2, respectively, in the first embodiment, and the scanning rectangular wave generation circuit 62 and the data driving circuits 70, which are similar to those in the first embodiment. The driving rectangular wave generation circuit 61B outputs a negative logic drive command signal DRV ON-N, which is a driving rectangular wave signal. The scanning rectangular wave generation circuit 62 outputs rectangular wave signals S62-1 and S62-2. The plurality of data driving circuits 70 passes drive current Iout to the common terminal IN as data for driving the plurality of light emitting element arrays 200B by time division based on the drive command signal DRV ON-N. The clock driving circuit 80B and the RL differential circuits 90B-1 and 90B-2 generate 2-phase clocks supplied to the self scanning circuit 100B based on the rectangular wave signals S62-1 and S62-2.

Similar to FIG. 1 for the first embodiment, to simplify the explanation, only one pair of the driving rectangular wave generation circuit 61B and the data driving circuit 70 is shown in FIG. 11. The plurality of light emitting element arrays 200B includes 4,992 light emitting thyristors 210B-1 to 210B-m, for example. The plurality of light emitting element arrays 200B is formed by separating the light emitting thyristors 210B-1 to 210B-m into a plurality of groups of light emitting thyristors 210B-1 to 210B-n. The groups of light emitting thyristors 210B-1 to 210B-n are separately driven simultaneously in parallel by the data driving circuits 70 respectively provided for each group.

Describing an example of typical design, similar to the first embodiment, 26 chips each including a light emitting array 200B, in which 192 light emitting thyristors 210B (210B-1 to 210B-n) are arrayed, are arranged on a printed wiring board 13b as shown in FIG. 4. As a result, the required 4,992 light emitting thyristors 210B-1 to 210B-m are formed on the optical print head 13. At this time, the data driving circuits 70 are provided in correspondence with the 26 light emitting arrays 200B. Therefore, the total number of output terminals from the data driving circuits 70 is 26.

On the other hand, the scanning rectangular wave generation circuit 62, the clock driving circuit 80B and the RL differential circuits 90B-1 and 90B-2 drive the chip that includes the arrayed self scanning circuits 100B. The scanning rectangular wave generation circuit 62, the clock driving circuit 80B and the RL differential circuits 90B-1 and 90B-2 are required for not only simply generating the clocks but also controlling the energy to turn on the below-discussed self scanning thyristors 111B. To perform fast operation of the optical print head 13B, it is preferable to provide the scanning rectangular wave generation circuit 62, the clock driving circuit 80B, the RL differential circuits 90B-1 and 90B-2 for each self scanning circuit 100B. However, if the data transmission by the optical print head 13B can be slow, the output terminals of the clock driving circuit 80B, the RL differential circuits 90B-1 and 90B-2 and the plurality of self scanning circuits 100B may be connected in parallel so that these circuits are shared.

The driving device of the second embodiment is configured from the data driving circuits 70, the clock driving circuits 80B and the RL differential circuits 90B-1 and 90B-2 and the self scanning circuits 100B. The data driving circuit 70, the clock driving circuit 80B and the RL differential circuits 90B-1 and 90B-2 are provided in the print controller 40B as shown in FIG. 11 but may be provided inside the optical print head 13B.

The clock driving circuit 80B is configured from an output buffer 81B that drives the rectangular wave signal S62-1, an output buffer 82B that drives the rectangular wave signal S62-2, and output terminals CK1R and CK2R for outputting a second 2-phase clock, which are connected to the output side of the output buffers 81B and 82B, respectively. The output buffers 8113 and 82B have the same circuitry and have an open drain configuration that uses a switching element (e.g., PMOS, which is a first conductive MOS transistor). As discussed below, the output buffers 81B and 82B are capable of generating a differential waveform (e.g., overshoot waveform) that is appropriate for triggering the gate of the self scanning thyristor 111B while maintaining a low (L) level output voltage.

That is, the output buffer 81B includes a second conductive MOS transistor (e.g., PMOS) 81d and a first conductive MOS transistor (e.g., NMOS) 81e. Of the PMOS 81d, the source and the gate are connected to the first power source (e.g., VDD power source), and the drain is connected to the output terminal CK1R. The PMOS 81d is always in the OFF state. Of the NMOS 81e, the gate is inputted with the rectangular wave signal S62-1, the source is connected to the second power source (e.g., ground GND), and the drain is connected to the drain of the PMOS 81d and the output terminal CK1R. Therefore, an NMOS open drain output buffer circuit is formed from the PMOS 81d and the NMOS 81e. There is a parasitic diode 81d-1 between the substrate terminal and the drain of the PMOS 81d, and there is a parasitic diode 81e-1 between the substrate terminal and the drain terminal of the NMOS 81e. The anode and cathode of the diode 81d-1 are connected in parallel to the drain and source of the PMOS 81d, respectively. The anode and cathode of the diode 81e-1 are connected in parallel to the source and the drain of the NMOS 81e, respectively.

Similarly, the output buffer 82B includes a PMOS 82d and an NMOS 82e. Of the PMOS 82d, the source and the gate are connected to the VDD power source, and the drain is connected to the output terminal CK2R. The PMOS 82d is always in the OFF state. Of the NMOS 82e, the rectangular wave signal S62-2 is inputted into the gate, the source is connected to ground GND, and the drain is connected to the drain of the PMOS 82d and the output terminal CK2R. Therefore, the PMOS 82d and the NMOS 82e form an NMOS open drain output buffer. There is a parasitic diode 82d-1 between the substrate terminal and the drain of the PMOS 82d, and there is a parasitic diode 82e-1 between the substrate terminal and the drain terminal of the NMOS 82e. The anode and cathode of the diode 82d-1 are connected in parallel to the drain and source of the PMOS 82d, respectively. The anode and cathode of the diode 82e-1 are connected in parallel to the source and the drain of the NMOS 82e, respectively.

The two RL differential circuits 90B-1 and 90B-2 have the same circuitry. Similar to the first embodiment, the RL differential circuit 90B-1 is connected between the output terminal CK1R of the clock driving circuit 80B and the clock terminal CK1. Similar to the first embodiment, the RL differential circuit 90B-2 is connected between the output terminal CK2R of the clock driving circuit 80B and the clock terminal CK2.

Similar to the RL differential circuit 90-1 in the first embodiment, the RL differential circuit 90B-1 is configured from a resistor 91-1, an inductor 92-1 and a resistor 93-1. The resistor 91-1 is connected between the output terminal CK1R and the clock terminal CK1. The inductor 92-1 and the resistor 93-1 are serially connected between the second power source (e.g., VDD power source), which is different from the first embodiment, and a position between the resistor 91-1 and the clock terminal CK1. Similarly, similar to the RL differential circuit 90-2 in the first embodiment, the RL differential circuit 90B-2 is configured from a resistor 91-2, an inductor 92-2 and a resistor 93-2. The resistor 91-2 is connected between the output terminal CK2R and the clock terminal CK2. The inductor 92-2 and the resistor 93-2 are serially connected between the second power source (e.g., VDD power source), which is different from the first embodiment, and a position between the resistor 91-2 and the clock terminal CK2.

The clock driving circuit 80B is configured from the open drain output buffers 81B and 82B that use NMOS. Therefore, the output state of the output terminals CK1R and CK2R falls the L level when the NMOS 81e and 82e are turned on. When the NMOS 81e and 82e are turned off, the output state of the output terminals CK1R and CK2R rises to the HiZ. However because the output terminal CK1R is connected to the VDD power source via the resistor 91-1, the inductor 92-1 and the resistor 93-1, and because the output terminal CK2R is connected to the VDD power source via the resistor 91-2, the inductor 92-2 and the resistor 93-2, the output terminals CK1R and CK2R rises to the H level In the below description, to avoid complexity of the description, explanation is made with a premise that the clock driving circuit 80B has two state values, H level and L level, in the output states thereof.

Similar to the first embodiment, depending on the driving capability of the clock driving circuit 80B, the resistance values of the resistors 91-1 and 91-2 may be approximately zero. In that case, the resistors 91-1 and 91-2 may be omitted. Similarly, the resistors 93-1 and 93-2 may be omitted.

(Light Emitting Thyristor in Second Embodiment) FIGS. 12A-12D illustrate a configuration of the light emitting thyristor 210B shown in FIG. 11.

Figure 12D:
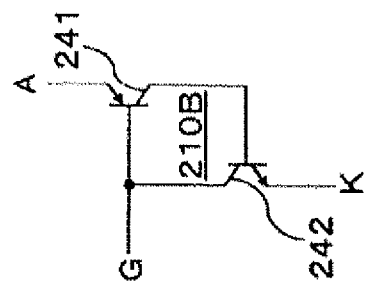
FIGS. 12A-12D illustrate a configuration of a light emitting thyristor shown in FIG. 11.
Figure 12C:
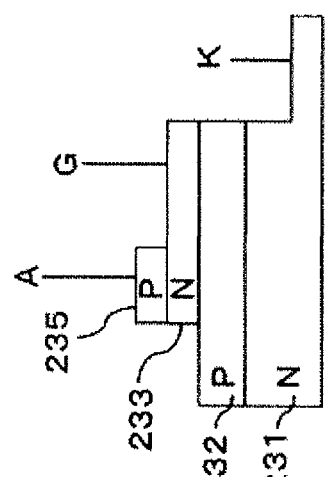
Figure 12B:
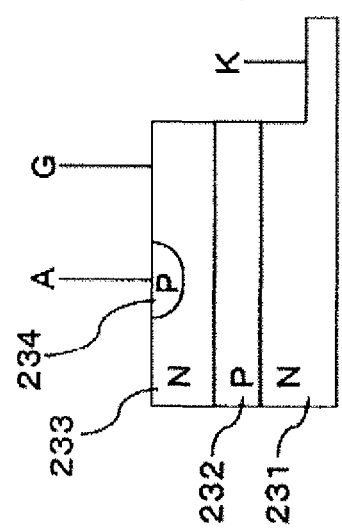
Figure 12A:
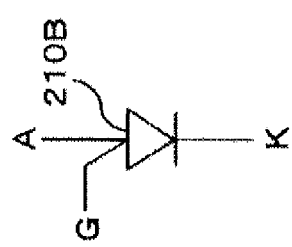

FIG. 12A shows circuit symbols of the light emitting thyristor 210B and includes an anode A, a cathode K and a gate G.

FIG. 12B illustrates a cross-sectional configuration of the light emitting thyristor 210B. Similar to the light emitting thyristor 210 in the first embodiment, the light emitting thyristor 210B is fabricated by using a GaAs wafer substrate, for example, and by epitaxially growing predetermined crystals on the GaAs wafer substrate by a known MO-CVD method.

That is, a three-layer wafer with an NPN configuration is formed by sequentially layering an N-type layer (N-type region) 231, a P-type layer (P-type region) 232 and an N-type layer (N-type region) 233, after epitaxially growing the predetermined buffer layer and sacrifice layer (not shown). In the N-type layer 231, an N-type impurity is contained in an AlGaAs material. The P-type layer 232 is formed to contain a P-type impurity. The N-type layer 233 is formed to contain an N-type impurity. Next, using a known photolithographic method, a P-type impurity region 234 is selectively formed at a part of the N-type layer 233 on the top. Further, using a known etching method, element isolation is performed by forming a trench (not shown). In addition, a part of the N-type layer 231, which is the bottom layer of the light emitting thyristor 210B, is exposed during the etching process, and metal wiring is formed in the exposed region to form the cathode K. At the same time, the anode A and the gate G are also formed in the P-type region 234 and the P-type region 232, respectively.

FIG. 12C is a cross-sectional configuration diagram that illustrates another form of the light emitting thyristor 210B. In this cross-sectional configuration, substantially similar to the light emitting thyristor 210 in the first embodiment, the light emitting thyristor 210B is fabricated by using a GaAs wafer substrate, for example, and by epitaxially growing predetermined crystals on the GaAs wafer substrate by a known MO-CVD method.

That is, a four-layer wafer with a PNPN configuration is formed by sequentially layering the N-type layer 231, the P-type layer 232, the N-type layer 233 and a P-type layer 235, after epitaxially growing the predetermined buffer layer and sacrifice layer (not shown). In the N-type layer 211, an N-type impurity is contained in the AlGaAs material. The P-type layer 232 is formed to contain a P-type impurity. The N-type layer 233 is formed to contain an N-type impurity. The P-type layer 235 is formed to complain a P-type impurity. Further, using a known etching method, element isolation is performed by forming a trench (not shown). In addition, a part of the N-type layer 231, which is the bottom layer of the light emitting thyristor 210B, is exposed during the etching process, and metal wiring is formed in the exposed region to form the cathode K. Similarly, a part of the P-type region 235, which is the top layer, is exposed, and metal wiring is formed in the exposed region to form the anode A. At the same time, the gate G is formed in the N-type region 232.

FIG. 12D is a representative circuit schematic of the light emitting thyristor 210B in contrast with FIGS. 12B and 12C. The light emitting thyristor 210B is formed from a PNPTR 241 and an NPNTR 242. The emitter of the PNPTR 241 corresponds to the anode A of the light emitting thyristor 210B. The base of the NPNTR 242 corresponds to the gate G of the light emitting thyristor 210B. The emitter of the NPNTR 242 corresponds to the cathode K of the light emitting thyristor 210B. The collector of the PNPTR 241 is connected to the base of the NPNTR 242, and the base of the PNPTR 241 is connected to the collector of the NPNTR 242.

The light emitting thyristors 210B shown in FIGS. 12A-12D are configured by forming the AlGaAs layer on the GaAs wafer substrate. However, similar to the light emitting thyristor 210 in the first embodiment, the light emitting thyristor 210B is not limited to this configuration, but a material, such as GaP, GaAsP or AlGaInP, may be used. Moreover, the light emitting thyristor 210B may be configured by forming a material, such as GaN, AlGaN or InGaN, on a sapphire substrate.

(Schematic Operation of Print Controller and Optical Print Head in Second Embodiment)

When the drive command signal DRV ON-N, which is outputted from the driving rectangular wave generation circuit 61B in the print controller 40B, is at the H level, for example, the PMOS 71a in the data driving circuit 70 is turned to the OFF state, and the NMOS 71b is turned to the ON state. Therefore, the voltage the data terminal DA falls to the L level via the resistor 72. As such, the common terminal IN and the anode of each light emitting thyristor 210B on the optical print head 13B side fall to the L level. As a result, the voltage between the anode and cathode of each light emitting thyristor 210B falls to approximately zero (0V), so that the drive current Iout, which flows between the anode and cathode of the light emitting thyristor 210B, also falls to zero. Thereby, all of the light emitting thyristors 210B-1 to 201B-n are in the non-light emitting state.

On the other hand, when the drive command signal DRV ON-N is at the L level, the PMOS 71a is turned to the ON state, and the NMOS 71b is turned to the OFF state. Therefore, the data terminal DA rises to the H level via the resistor 72. As a result, the common terminal IN also is turned to approximately the power source voltage VDD via the connection connector 96-1, the connection cable 95-1 and the connection connector 97-1. Thus, approximate power source voltage VDD is applied between the anode and cathode of each light emitting thyristor 210B.

At this time, among the light emitting thyristors 210B-1 to 210B-n, the gates of the light emitting thyristors 210B, which are instructed by the self scanning circuit 100B to emit light, selectively fall to the L level. As a result, the trigger current is generated at the gate of the light emitting thyristors 210B, and thereby, the thyristors 210B, which are instructed to emit light, are turned on. The current that flows into the anode of the tuned-on light emitting thyristors 210B is the current that is supplied from the data terminal DA (i.e., drive current Iout) and causes the light emitting thyristor 210B to turn to the light emission state to generate light emitting power based on the value of the drive current Iout.

That is, to consider the operation of the light emitting thyristors 210B-1 to 210B-n, taking into account the thyristors 111B (111B-1 to 111B-n) in the circuits 110B-1 to 110B-n of the self scanning circuit 100B that is turned on, the cathode of the light emitting thyristors 210 is connected to ground GND. When the cathode rises to the H level, voltage is applied between the anode and cathode of the light emitting thyristors 210B. On the other hand, because the gate of each thyristor 111B in the self scanning circuit 100B and each gate of the light emitting thyristors 210B are respectively connected to each other, voltage is also applied between the anode and gate of the thyristors 111B. At this time, because the gates of the light emitting thyristors 210B among the light emitting thyristors 210B-1 to 210B-n, which have been instructed by the self scanning circuit 100B to emit light, selectively fall to the L level, the trigger current is generated at the gate of the light emitting thyristors 210B, and thereby the light emitting thyristors 210B, which have been instructed to emit light, are turned on. At this time, the current that flows into the anode of the light emitting thyristors 210B is the drive current Tout that flows into the data terminal DA and causes the light emitting thyristor 210B to turn to the light emission state to generate light emitting power based on the value of the drive current Iout.

Figure 13:
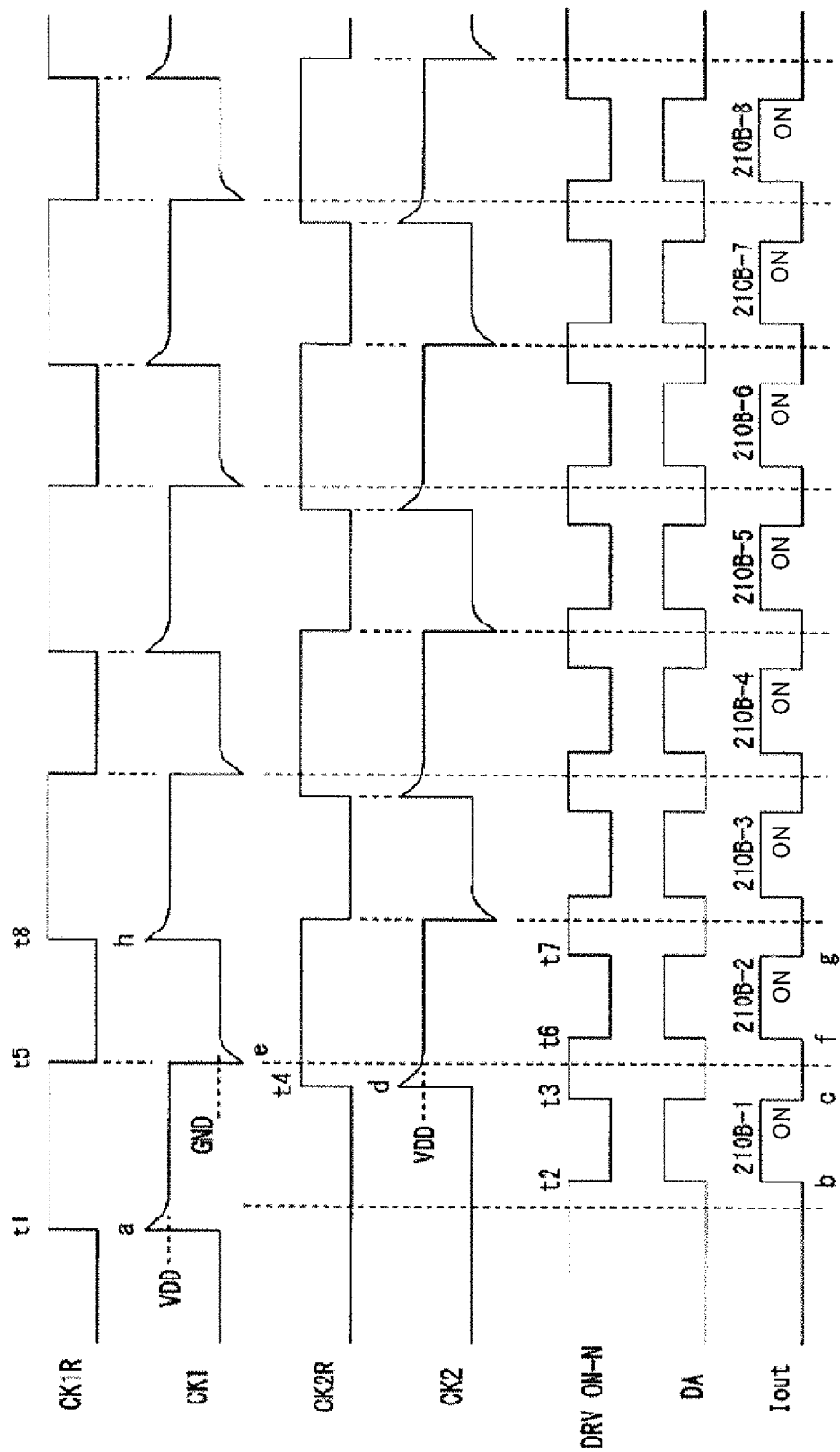
FIG. 13 is a timing chart that illustrates operation of the circuit shown in FIG. 11.

(Detailed Operation of Print Controller and Optical Print Head in Second Embodiment) FIG. 13 a timing chart that illustrates detailed operation of the optical print head 13B and the print controller 40B shown in FIG. 11.

Similar to FIG. 7 in the first embodiment, FIG. 13 shows operational waveforms during a case in which the light emitting thyristors 210B-1 to 210B-n (e.g., n=8) in FIG. 11 are sequentially turned on in a single line scanning during the print operation in the image forming device 1 shown in FIG. 2.

In the timing chart shown in FIG. 13, in the state shown at the left end part, the rectangular wave signals 562-1 and S62-2 outputted from the scanning rectangular wave generation circuit 62 are inverted by the output buffers 81B and 82B, and the signals of the output terminals CK1R and CK2R are at the L level.

The output terminal CK1R of the clock driving circuit 808 is connected to the clock terminal CK1 via the resistor 91-1. The clock terminal CK1 is connected to the VDD power source via the serial circuit of the inductor 92-1 and the resistor 93-1. Similarly, the output terminal CK2R of the clock driving circuit 80B is connected to the clock terminal CK2 via the resistor 91-2. The clock terminal CK2 is connected to the VDD power source via the serial circuit of the inductor 92-2 and the resistor 93-2.

As a result, the potential of the clock terminal CK1 is the L level potential that is obtained by dividing the potential difference between the L level potential from the output terminal CK1R and the power source voltage VDD by the resistors 91-1 and 93-1. At this time, by setting the resistance of the resistor 93-1 much greater than the resistance of the resistor 91-1 (resistance of the resistor 93-1>>resistance of the resistor 91-1), it is easy to set the L level at a value close to ground GND potential. If the resistor 91-1 is omitted, the L level potential may be made approximately equal to ground GND potential.

Similarly, the potential of the clock terminal CK2 is the L level potential obtained by dividing the potential difference between the L level potential from the output terminal CK2R and the power source voltage VDD by the resistors 91-2 and 93-2. At this time, by setting the resistance of the resistor 93-2 much greater than the resistance of the resistor 91-2 (resistance of the resistor 93-2>>resistance of the resistor 91-2), it is easy to configure the L level at a value close to ground GND potential. If the resistor 91-2 is omitted, the L level potential may be made approximately equal to ground potential GND.

As described above, in the state shown at the left end part of the timing chart in FIG. 13, the signals from the clock terminals CK1 and CK2 are both at the L level. Therefore, the anodes of a group of the self scanning thyristors 111B-1, 111B-3, 111B-5 and 111B-7 in the odd-stage circuits 110B-1, 110B-3, 110B-5 and 110B-7 and a group of the self scanning thyristors 111B-2, 111B-4, 111B-6 and 111B-8 in the even-stage circuit 110B-2, 110B-4, 110B-6 and 110B-8 fall to the L level. Accordingly, the self scanning thyristors 111B-1 to 111B-8 are in the OFF state. At this time, the drive command signal DRV ON-N is at the H level, and the output terminal of the CMOS inverter 71 is at the L level. The anodes of the light emitting thyristors 210B-1 to 210B-8 are also at the L level via the resistor 72, the data terminal DA, the connection connector 96-1, the connection cable 95-1, the connection connector 97-1 and the common terminal IN. Therefore, the light emitting thyristors 210B-1 to 210B-8 are in the OFF state.

Processes (1) and (2) for turning on the thyristors 111B-1 and 111B-2 in the first-stage circuit 110B-1 and the second-stage circuit 110B-2 are described below.

(1) Process for Turning on Thyristor 111B-1 in First-Stage Circuit 110B-1

At t1 in FIG. 13, the rectangular wave signal S62-1 outputted from the scanning rectangular wave generation circuit 62 is inverted by the output buffer 81B in the clock driving circuit 80B, and the output terminal CK1R rises to the H level. Then, back voltage is generated at the inductor 92-1, causing the voltage at the clock terminal CK1 to increase more than the power source voltage VDD and to form an overshoot as shown at part a.

At this time, taking the thyristor 111B-1 in the first-stage circuit 110B-1 into account, the anode voltage is the power source voltage VDD, which is 3.3 V for a typical design example. In contrast, the cathode of the diode 112B-1 is connected to the clock terminal CK2, and the voltage of the clock terminal CK2 is at the L level, which is close to ground GND potential. Therefore, the H level potential passes between the anode and gate of the thyristor 111B-1, and thereby the current flows to the clock terminal CK1 via the diode 112B-1. As a result, the thyristor 111B-1 is turned on by this current as the trigger current.

At t2, the drive command signal DRV ON-N, which is outputted from the driving rectangular wave generation circuit 61B, rises. The drive command signal DRV ON-N is inverted by the CMOS inverter 71, so that the data terminal DA rises to the H level via the resistor 72. As a result, voltage that is approximately equivalent to the power source voltage VDD is applied between the anode and cathode of the light emitting thyristor 210B-1. At this time, because the thyristor 111B-1 is on, the light emitting thyristor 210B-1, which shares the gate voltage with the gate of the thyristor 111B-1, turns on, and the drive current Iout is generated at the anode of the light emitting thyristor 210B-1 as shown at part b. Therefore, the light emitting output is generated based on the value of the drive current Iout.

At t3, the drive command signal DRV ON-N raises. The drive command signal DRV ON-N is inverted by the CMOS inverter 71, and the data terminal DA falls to the L level. As a result, voltage between the anode and cathode of the light emitting thyristor 210B-1 falls to approximately zero (0 V), and thereby the light emitting thyristor 210B-1 is turned off. The drive current Iout falls to approximately zero as shown at part c.

In the second embodiment, a latent image is formed on the photosensitive drum 11 shown in FIG. 2 by emitting light by the light emitting thyristor 210B-1. An amount of exposure energy at this time is a product of the light emission power based on the value of the drive current Iout and the exposure time (=t3−t2). Therefore, even if there is a difference in luminous efficiency originated from the fluctuations in manufacturing the light emitting thyristor 210B-1 and the like, the fluctuations in the amount of exposure energy may be corrected by adjusting the exposure time (=t3−t2) for each light emitting thyristor 210B-1.

In addition, when the light emission by the light emitting thyristor 210B-1 is not necessary, the drive command signal DRV ON-N is maintained at the H level between t2 and t3. Therefore, the light emission by the light emitting thyristor 210B-1 may be controlled by the drive command signal DRV ON-N.

(2) Process for Turning on Thyristor 111B-2 in Second-Stage Circuit 110B-2

At t4 shown in FIG. 13, the rectangular wave signal S62-2, which is outputted from the scanning rectangular wave generation circuit 62, is inverted by the output buffer 82B in the clock driving circuit 80B, so that the output terminal CK2R rises to the H level. At this time, the back voltage is generated at the inductor 92-2, causing the voltage at the clock terminal CK2 to increase more than the power source voltage VDD and to form the overshoot waveform, as shown at part d.

Taking the thyristor 111B-2 in the second-stage circuit 110B-2 into account, the anode voltage is the power source voltage VDD, which is 3.3 V for a typical design example. In contrast, the cathode of the diode 112B-2 is connected to the gate of the thyristor 111B-1. Because the thyristor 111B-1 is in the ON state, the cathode voltage of the diode 112B-2 is at the L level, which is close to ground GND potential. Therefore, the current flows to ground GND through the anode and gate of the thyristor 111B-2, through the anode and gate of the thyristor 111B-2, and via the anode and cathode of the diode 112B-2. As a result, the thyristor 111B-2 is turned on by this current as the trigger current.

At t5, the output terminal CK1R of the clock driving circuit 80B falls to the L level. At this time, the back voltage is generated at the inductor 92-1, causing overshoot voltage at the clock terminal CK1 as shown at part e. The voltage between the anode and cathode of the thyristor 111B-1 is rapidly reduced, and thereby the thyristor 111B-1 is turned on.

At t6, the drive command signal DRV ON-N falls and is inverted by the CMOS inverter 71, so that the data terminal DA rises to the H level. When the data terminal DA rises to the H level, voltage that is approximately equivalent to the power source voltage VDD is applied between the anode and cathode of the light emitting thyristor 210B-2. As discussed above, at t6, the thyristor 111B-2 is in the ON state, and the thyristor 111B-1 is in the OFF state.

Because the thyristor 111B-2 is on, the light emitting thyristor 210B-2, which shares the gate voltage with the gate of the thyristor 111B-2 is turned on. At the cathode of the thyristor 210B-2, the drive current Iout is generated as shown at part f, and the light emission power is generated based on the value of the drive current Iout.

At t7, the drive command signal DRV ON-N rises. The drive command signal DRV ON-N is inverted by the CMOS inverter 71, and the data terminal DA falls to the L level. As a result, voltage between the anode and cathode of the light emitting thyristor 210B-2 falls to approximately zero (0 V), and thereby the light emitting thyristor 210B-1 is turned off. The drive current Iout falls to approximately zero as shown at part g.

Similarly, the light emitting thyristors 210B-3 to 210B-8 are sequentially turned thereafter by sequentially transitioning the signals at the output terminals CK1R and CK2R in the clock driving circuit 80B and turning on and off the drive command signal DRV ON-N in each light emitting thyristor.

As described in detail using FIG. 13, the clocks supplied from the clock terminals CK1 and CK2 have formations in which similar waveforms are repeated with an opposite phase. By sequentially inputting these clock waveforms to the group of the odd-stage self scanning thyristors 111B-1, 111B-3, 111B-5 and 111B-7 and to the group of the even-stage self scanning thyristors 111B-2, 111B-4, 111B-6 and 111B-8, the self scanning thyristors 111B-1 to 111B-8 at each stage are sequentially turned on.

The gate voltage of the self scanning thyristor 111B in the ON state is at the L level. The gate voltage of the self scanning thyristor 111B in the OFF state is approximately equivalent to the anode voltage of the self scanning thyristor 111B. As discussed above, as a result of sequentially turning on the self scanning thyristor 111B-1 to 111B-8, the self scanning circuit 100B shown in FIG. 11 performs operation as a shift resistor. The gates of the self scanning thyristors 111B-1 to 111B-8 function as the output terminals Q1-Q8 of the self scanning circuit 100B. Therefore, the position of the light emitting thyristors in the light emitting element array 200B can be designated, and the designation of turning on and off, as well as the time for light emission, for the light emitting thyristors 210B-1 to 210B-8 can be controlled based on the value of the data terminal DA.

Figure 14:
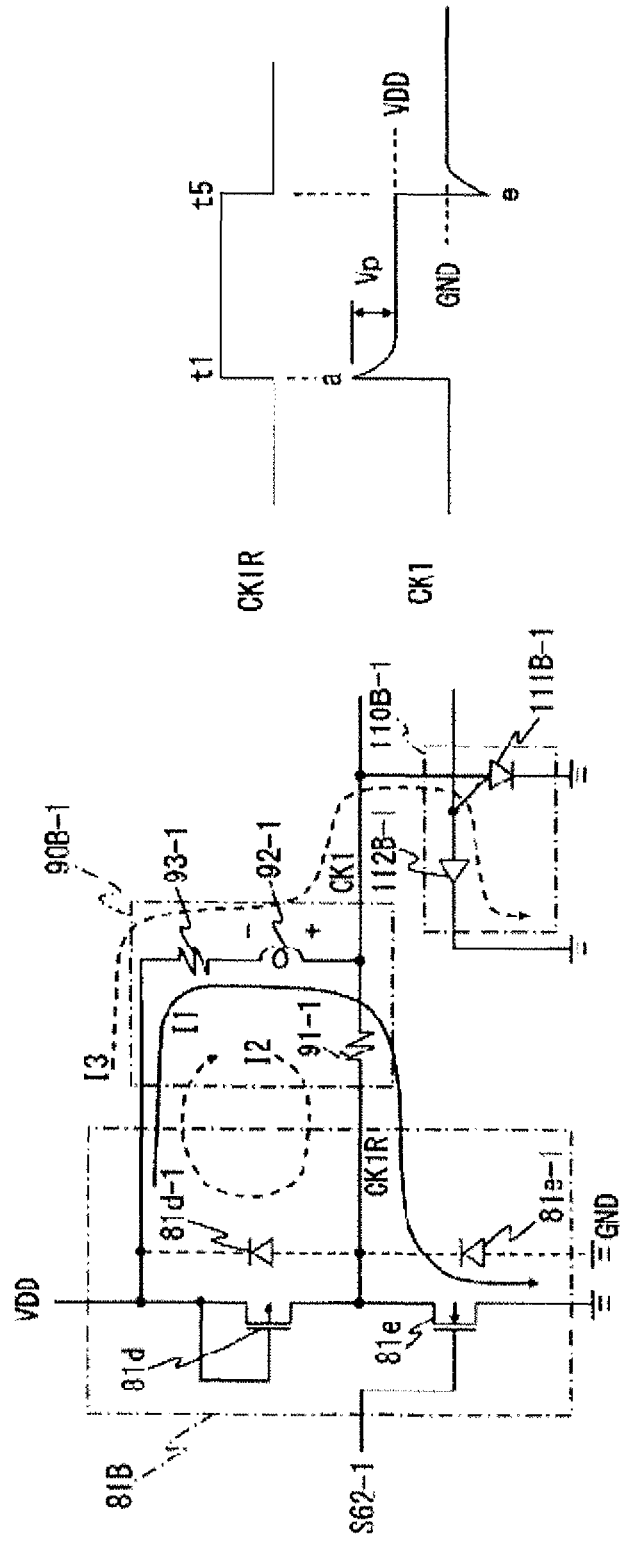
FIG. 14A illustrates a clock driving circuit, the RL differential circuit and the first stage circuit shown in FIG. 11.
FIG. 14B illustrates a part of the timing chart shown in FIG. 13.

(Explanation of Overshoot Waveform in FIG. 13) FIG. 14A illustrates a circuit diagram of a part of the output buffer 81B in the clock driving circuit 80B, the RL differential circuit 90B-1 and the first-stage circuit 110B-1 shown in FIG. 11. FIG. 14B illustrates a voltage waveform chart of a part of the timing chart shown in FIG. 13.

In FIG. 14A, the cathode of the thyristor 111B-1 is connected to ground GND. The anode of the thyristor 111B-1 is connected to the clock terminal CK1 and further to the output terminal CK1R via the resistor 91-1. In addition, the clock terminal CK1 is connected to the VDD power source via the inductor 92-1 and the resistor 93-1. The anode of the diode 112B-1 is connected to the gate of the thyristor 111B-1. The cathode of the diode 112B-1 is connected to the clock terminal CK2 as shown in FIG. 11. However, because the signal level at the cathode of the diode 112B-1 in the turn-on process of the thyristor 111B-1 is the L level, the cathode of the diode 112B-1 is connected to ground GND in FIG. 14A for the purpose of simplifying the drawing.

A case in which the output terminal CK1R of the clock driving circuit 80B is at the L level, for example, is considered.

This corresponds to the state at the left end part of the timing chart shown in FIG. 13. At this time, the current I1 flows in the direction shown by the solid line arrow in FIG. 14A. The current I1 flows on a path from the VDD power source, through the resistor 91-1, the inductor 92-1 and the resistor 93-1, via the NMOS81e, and to ground GND.

Next, at t1 in FIG. 13, the NMOS 81e is turned to the OFF state. Then, the back voltage is generated at the inductor 92-1 in the direction marked by symbols "+" and "−" in FIG. 14A, causing the current I2 flowing in the direction indicated by the broken line arrow. The current I2 flows on a first current path that passes through the inductor 92-1, the resistor 93-1, the diode 81d-1 and the resistor 91-1 and returns to the inductor 92-1.

At this time, taking the first current path into account, because the cathode of the diode 81b-1 is connected to the VDD power source, the potential of the output terminal CK1R rises higher than the power source voltage VDD by the forward voltage of the diode 81d-1. In addition, the potential of the output terminal CK1 rises higher than the forward voltage of the diode 81d-1 by the voltage drop occurred at both ends of the resistor 91-1.

As a result, as shown by the broken line arrow, the current I3 flows on a second current path from the VDD power source, through the resistor 93-1, the inductor 92-1, the anode and gate of the thyristor 111B-1 and the diode 112B-1, and to ground GND. The current that flows between the anode and gate of the thyristor 111B-1 becomes the trigger current to turn on the thyristor 111B-1.

FIG. 14B shows a voltage waveform that describes the process described in FIG. 14A. When the output terminal CK1R rises to the H level, an overshoot part is generated at the clock terminal CK1 as indicated by part a. Therefore, the potential can be higher than the power source voltage VDD by the amount of voltage Vp.

In the typical design example, the power source voltage VDD is 3.3 V. When the forward voltage Vf of the diode 112B-1 is 1.6 V and when the forward voltage Vag of the PN junction generated between the anode and gate of the thyristor 111B-1 is also 1.6 V, the following equation must be met in order to generate the current I3 on the second path:

$$Vf+Vag<VDD+Vp$$

At this time, if there is no overshoot part a on the waveform of the clock terminal CK1 shown in FIG. 14B and if Vp=0, the sum of Vf and Vag becomes the following value:

$$Vf+Vag=1.6+1.6=3.2V$$

Therefore, the sum becomes approximately the same value as the power voltage VDD. Thus, the trigger current that is enough to turn on the thyristor 111B-1 cannot be obtained.

On the other hand, by providing the value Vp=0.6 V as the overshoot waveform, the sum of VDD and Vp becomes the following value:

$$VDD+Vp=3.3+0.6=3.9V$$

This value allows large enough gate trigger current to turn on the thyristor 111B-1.

Figure 15:
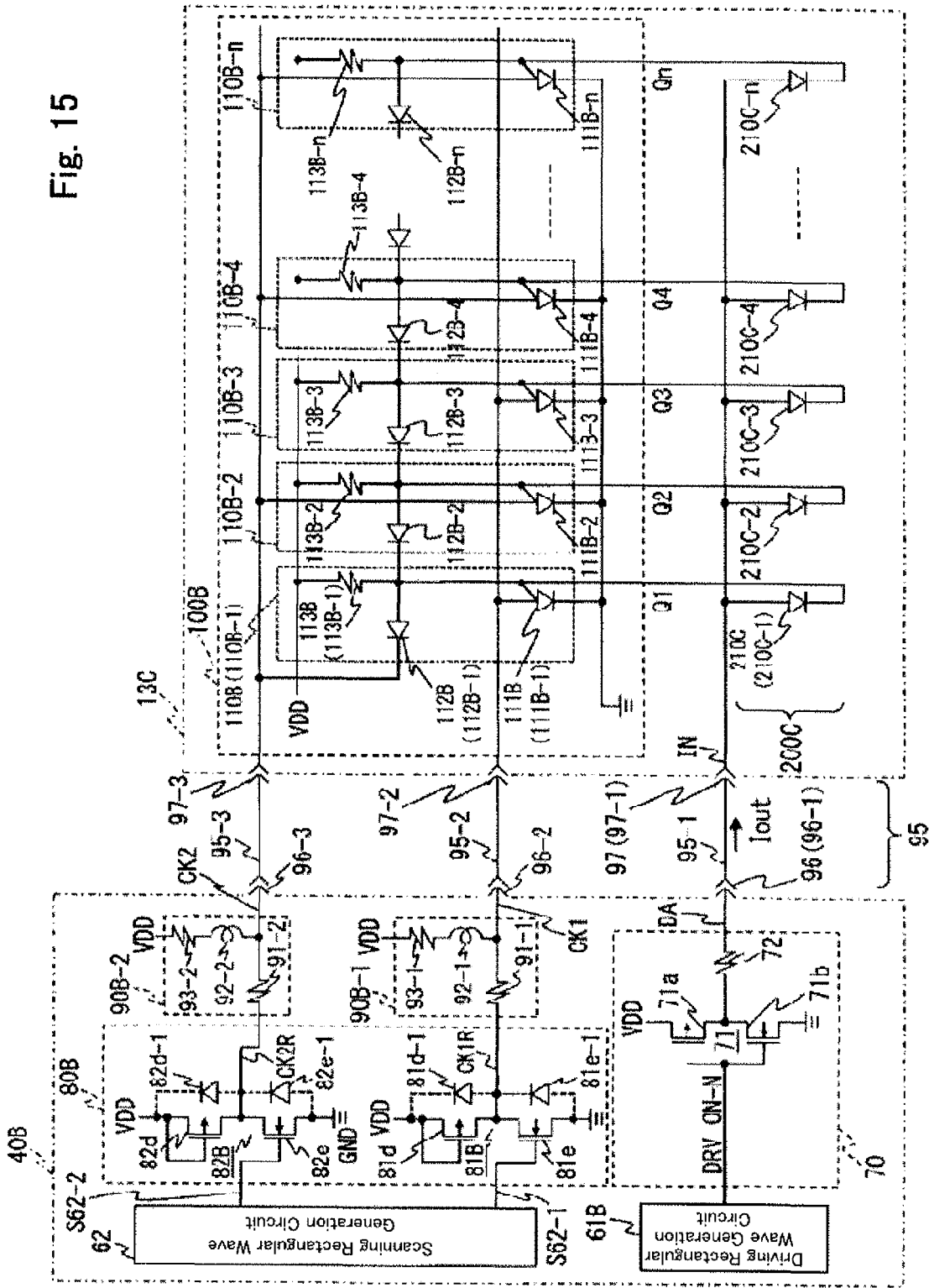
FIG. 15 is a block diagram that illustrates circuitry of the print controller and the optical print head according to a first exemplary modification of FIG. 11.

(First Exemplary Modification of Second Embodiment) FIG. 15 is a block diagram that illustrates schematic circuitry of the print controller 40B and an optical print head 13C according to a first exemplary modification of the second embodiment shown in FIG. 11. Same references are used for the elements that are common with the elements in FIG. 11.

The first exemplary modification includes the print controller that is similar to that in the second embodiment. To the print controller 40B, the optical print head 13C, which is different from the optical print head 13B in the first embodiment, is connected via a plurality of the connection connectors 96 (96-1 to 96-3), the connection cables 95 (95-1 to 95-3) and the connection connectors 97 (97-1 to 97-3), which are similar to those in the first embodiment. The optical print head 13C of the first exemplary modification includes the self scanning circuit 100B, which is similar to that in the second embodiment, and a light emission element array 200C, which includes a different configuration from the light emission element array 200B in the second embodiment.

The light emission element array 200C includes a plurality of N gate-type LEDs 210C (210C-1 to 210C-m) as 2-terminal light emitting elements. Of each LED 210C, the anode is connected to the connection connector 97-1 via the common terminal IN through which the drive current Iout flows, and the cathode is connected to respective ones of the output terminals Q1-Qm of the self scanning circuits 100B. Similar to the second embodiment, the LEDs 210C-1 to 210C-m are divided into a plurality of groups of LEDs 210C-1 to 210C-n. Each group is separately and simultaneously driven in parallel by respective ones of the self scanning circuits 100. Similarly, the output terminals Q1-Qm are divided into a plurality of groups of output terminals Q1-Qn. The LED 210C emits light when the predetermined voltage is applied between the anode and cathode and when the LED 210C is turned to the ON state as cathode current flows between the anode and cathode thereof. Similar to the second embodiment, the total number of the LEDs 210C-1 to 210C-m (and the output terminals Q1 to Qm) may be 4,992 with the optical print head 13C, which is capable of printing an A4-size sheet at a resolution of 600 dots per inch. These LEDs form the array.

The print controller 40B and the optical print head 13C with such configuration operate as follows.

When the drive command signal DRV ON-B outputted from the driving rectangular wave generation circuit 61B is at the H level, for example, the data terminal DA falls to the L level via the resistor 72 because of the CMOS inverter 71 in the data driving circuit 70. As such, the common terminal IN and the anode of each LED 210C on the side of the optical print head 13C falls to the L level via the connection connector 96-1, the connection cable 95-1 and the connection connector 97-1. As a result, all of the LEDs 210C-1 to 201C-n are in the non-light emitting state.

On the other hand, when the drive command signal DRV ON-N is at the L level, the data terminal DA rises to the H level via the resistor 72 because of the CMOS inverter 71. As a result, the common terminal IN is also turned to approximately power source voltage VDD via the connection connector 96-1, the connection cable 95-1 and the connection connector 97-1. At this time, among the LEDs 210C-1 to 210C-n, by causing the cathode of the LED 210C designated by the self scanning circuit 100 to emit light, to selectively fall to the L level, the LED 210C designated by the self scanning circuit 100B to emit light is turned to the ON state. The current that flows to the anode of the LED 210C in the ON state is the drive current Iout supplied from the data terminal DA, and the LED 210A is turned in the light emitting state and generates light emission power based on the value of the drive current Iout. The first exemplary modification operates substantially similarly to the second embodiment.

Figure 16:
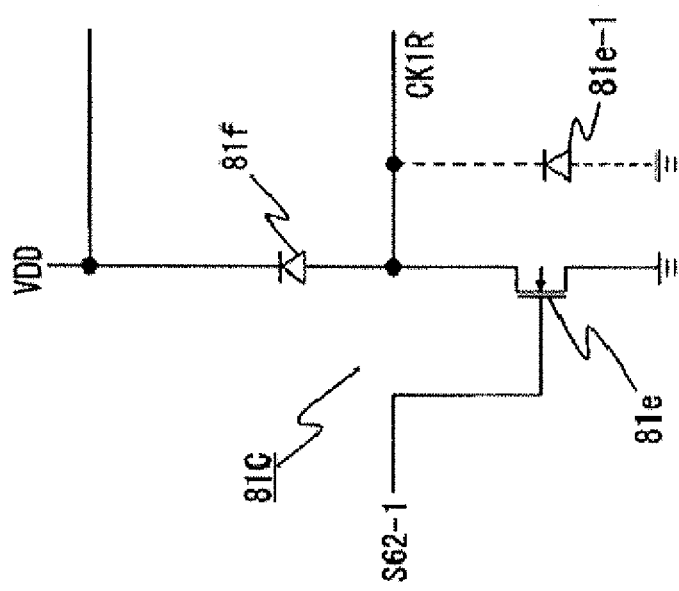
FIG. 16 is a circuit diagram that illustrates an output buffer according to a second exemplary modification of FIGS. 11 and 15.

(Second Exemplary Modification of Second Embodiment) FIG. 16 is a circuit diagram that illustrates an output buffer according to the second exemplary modification of FIGS. 11 and 15. Same references are used for the elements that are common with the elements in FIGS. 11 and 15.

In an output buffer 81C in the second exemplary modification, a standard diode 81f is provided instead of the PMOS 81d and the parasitic diode 81d-1 in the output buffer 8113 shown in FIGS. 11 and 15. Of the diode 81f, the anode is connected to the output terminal CK1R, and the cathode is connected to the VDD power source. In addition, although not shown, a standard diode is provided instead of the PMOS 82d and the parasitic diode 82d-1 in the output buffer 8213 shown in FIGS. 11 and 15.

The diode 81f includes a function to allow the current I2 to flow from the side of the output terminal CK1R to the side of the VDD power source, for example. Even with such diode 81f, the operation similar to those in FIGS. 11 and 15 is performed.

(Advantages of Second Embodiment and First and Second Exemplary Modifications) The following advantages (a) and (b) are achieved according to the second embodiment and the first and second exemplary modifications.

(a) According to the first embodiment and the first and second exemplary modifications, the clock driving circuit 80B has an open drain configuration that uses an NMOS, and the output signals from the clock driving circuit 80B is differentiated at the RL differential circuits 90B-1 and 90B-2 to generate the overshoot waveform shown at part a in FIG. 14B. Therefore, only one of each of the output terminals CK1R and CK2R is sufficient for each clock in the clock driving circuit 80B, which reduces the number of desired terminals by half compared to the conventional configuration. As a result, not only the data transfer speed at the optical print head 13B or 13C is improved, but also the number of the output terminals CK1R and CK2R in the clock driving circuit 80B is reduced. Therefore, the reduction of circuit size and lower cost are achieved.

(b) According to the image forming device 1 in the second embodiment and the first and second exemplary modifications, with the optical print head 13B or 13C, the same advantage as the advantage (b) in the first embodiment is obtained.

(Other Exemplary Modifications of First and Second Embodiments) The present embodiment is not limited to the above-described first and second embodiments and the respective first and second exemplary modifications. Rather, other modifications and/or various usages are possible. The following (I) and (II) are examples of such other modifications and/or various usages.

(I) In the first and second embodiments and their respective first and second exemplary modifications, cases are discussed in which the first and second embodiments and their respective first and second exemplary modifications are applied to the light emitting thyristors 210 and 210B and LEDs 210A and 210C that are used as light sources. However, the first and second embodiments and their respective first and second exemplary modifications may be applied in a ease in which, using the thyristors as switching elements, a voltage application control is performed on other elements (e.g., organic electroluminescent elements (hereinafter "organic EL elements") that are serially connected to the switching elements, for example. For instance, the first and second embodiments and their respective first and second exemplary modifications may be used in a printer that includes an organic EL print head configured by organic EL element arrays, a display device including display element arrays, and the like.

(II) The first and second embodiments and their respective first and second exemplary modifications may be applied to thyristors that may be used as switching elements for driving (i.e., controlling application of voltage to) display elements (display elements that are arranged in arrays or matrixes). In addition, the first and second embodiments and their respective first and second exemplary modifications may be applied in a case of not only the thyristors with the 3-terminal configuration but also 4-terminal thyristor semiconductor controlled switch (SCS) including first and second gates.

What is claimed is:
1. A driving device that drives a plurality of light emitting elements that are connected in parallel to a common terminal, comprising:
   a scanning circuit, in which a plurality of 3-terminal switching elements are arranged, the plurality of 3-terminal switching elements each including a first terminal connected to a first power source, a second terminal connected to one of a first clock terminal and a second clock terminal, and a control terminal that is connected to the second clock terminal and that controls an ON/OFF state between the first and second terminals, wherein the scanning circuit outputs a signal, which flows to each of the control terminal, to the plurality of light emitting elements by ON/OFF switching of the 3-terminal switching elements based on a first clock signal supplied from the clock terminal, and the scanning circuit sequentially scans and drives the plurality of light emitting elements;
   a data driving circuit that drives a driving rectangular wave signal and that supplies a data signal to the common terminal;

a clock driving circuit that drives a scanning rectangular wave signal and that generates the first clock signal and a second clock signal;
a first differential circuit that includes the first clock terminal and that outputs the first clock signal; and
a second differential circuit that includes the second clock terminal and that outputs the second clock signal, wherein
a differential waveform is formed at an edge of the second clock signal by differentiating the second clock signal using an inductor,
the clock driving circuit includes:
a first conductive transistor that is connected between the first power source and an output terminal that outputs the second clock signal and that switches ON/OFF by the scanning rectangular wave signal,
a second conductive transistor that is connected between the output terminal and the second power source and that is different from the first conductive transistor, the second conductive transistor being set to an OFF state by a potential of the second power source, and
a diode provided between the output terminal and the second power source so as to prevent electric current flowing from the output terminal to the second power source, and
the output terminal forms an open-drain output.

2. The driving device of claim 1, wherein the diode is configured from a parasitic diode that is formed in a second conductive MOS transistor that is different from the first conductive MOS transistor.

3. The driving device of claim 1, wherein the differential circuit includes the inductor that is connected between the second power source and a position between the output terminal and the clock terminal.

4. The driving device of claim 2, wherein the differential circuit includes the inductor that is connected between the second power source and a position between the output terminal and the clock terminal.

5. The driving device of claim 1, wherein the differential circuit includes the inductor and a resistor that are serially connected between the second power source and a position between the output terminal and the clock terminal.

6. The driving device of claim 2, wherein the differential circuit includes the inductor and a resistor that are serially connected between the second power source and a position between the output terminal and the clock terminal.

7. The drive device of claim 1, wherein the 3-terminal switching elements are configured from thyristors.

8. An optical print head, comprising:
a plurality of light emitting elements that are connected in parallel to a common terminal; and
a driving device that drives the plurality of light emitting elements, the driving device includes:
a scanning circuit, in which a plurality of 3-terminal switching elements are arranged, the plurality of 3-terminal switching elements each including a first terminal connected to a first power source, a second terminal connected to one of a first clock terminal and a second clock terminal, and a control terminal that is connected to the second clock terminal and that controls an ON/OFF state between the first and second terminals, wherein the scanning circuit outputs a signal, which flows to each of the control terminal, to the plurality of light emitting elements by ON/OFF switching of the 3-terminal switching elements based on a first clock signal supplied from the clock terminal, and the scanning circuit sequentially scans and drives the plurality of light emitting elements;
a data driving circuit that drives a driving rectangular wave signal and that supplies a data signal to the common terminal;
a clock driving circuit that drives a scanning rectangular wave signal and that generates the first clock signal and a second clock signal;
a first differential circuit that includes the first clock terminal and that outputs the first clock signal; and
a second differential circuit that includes the second clock terminal and that outputs the second clock signal, wherein
a differential waveform is formed at an edge of the second clock signal by differentiating the second clock signal using an inductor,
the clock driving circuit includes:
a first conductive transistor that is connected between the first power source and an output terminal that outputs the second clock signal and that switches ON/OFF by the scanning rectangular wave signal,
a second conductive transistor that is connected between the output terminal and the second power source and that is different from the first conductive transistor, the second conductive transistor being set to an OFF state by a potential of the second power source, and
a diode provided between the output terminal and the second power source so as to prevent electric current flowing from the output terminal to the second power source, and
the output terminal forms an open-drain output.

9. The optical print head of claim 8, wherein the light emitting elements are configured from 3-terminal light emitting elements.

10. The optical print head of claim 9, wherein the 3-terminal light emitting elements are light emitting thyristors.

11. The optical print head of claim 8, wherein the light emitting elements are configured from 2-terminal light emitting elements.

12. The optical print head of claim 11, wherein the 2-terminal light emitting elements are light emitting diodes.

13. An image forming device, comprising:
the optical print head of claim 8; and
a photosensitive drum, wherein
a toner image is formed on a recording medium by exposing the photosensitive drum using the optical print head, attaching toner on an electrostatic latent image, and transferring the attached toner image onto a recording medium.

14. The driving device according to claim 1, wherein the plurality of 3-terminal switching elements include a first set of 3-terminal switching elements and a second set of 3-terminal switching elements,
the second terminal of the first set of 3-terminal switching elements is connected to the first clock terminal, and
the second terminal of the second set of 3-terminal switching elements is connected to the second clock terminal.

15. The optical print head according to claim 8, wherein the plurality of 3-terminal switching elements include a first set of 3-terminal switching elements and a second set of 3-terminal switching elements,
the second terminal of the first set of 3-terminal switching elements is connected to the first clock terminal, and
the second terminal of the second set of 3-terminal switching elements is connected to the second clock terminal.

16. A driving device that drives a plurality of light emitting elements that are connected at multiple points to a common terminal, comprising:
- a scanning circuit, in which a plurality of 3-terminal switching elements are arranged, the plurality of 3-terminal switching elements each including a first terminal connected to a first power source which potential differs from a second power source, a second terminal connected to a clock terminal, and a control terminal that controls an ON/OFF state between the first and second terminals, wherein the scanning circuit outputs a signal, which flows to the control terminal, to the plurality of light emitting elements by ON/OFF switching of the 3-terminal switching elements based on a first clock signal supplied from the clock terminal, and the scanning circuit sequentially scans and drives the plurality of light emitting elements;
- a data driving circuit that drives a driving rectangular wave signal and that supplies a data signal to the common terminal;
- a clock driving circuit that drives a scanning rectangular wave signal and that outputs a second clock signal; and
- a differential circuit that generates the first clock signal in which a differential waveform is formed at an edge of the second clock signal by differentiating the second clock signal using an inductor, and that supplies the first clock signal to the clock terminal, wherein the clock driving circuit includes:
- a first conductive transistor that is connected between the first power source and an output terminal that outputs the second clock signal and that switches ON/OFF by the scanning rectangular wave signal,
- a second conductive transistor that is connected between the output terminal and the second power source and that is different from the first conductive transistor, the second conductive transistor being set to an OFF state by a potential of the second power source, and
- a diode provided between the output terminal and the second power source so as to prevent electric current flowing from the output terminal to the second power source, and the output terminal forms an open-drain output.

17. The driving device according to claim 16, wherein the diode is configured from a parasitic diode formed in the second conductive transistor.

18. The driving device according to claim 16, wherein the differential circuit includes the inductor that is connected between the second power source and a position between the output terminal and the clock terminal.

19. The driving device according to claim 16, wherein the differential circuit includes the inductor and a resistor serially connected between the second power source and a position between the output terminal and the clock terminal.

20. An optical print head comprising the driving device according to claim 16.

21. An image forming device that uses the optical print head according to claim 20.

* * * * *